(12) United States Patent
Henchy

(10) Patent No.: US 11,024,190 B1
(45) Date of Patent: Jun. 1, 2021

(54) ONLINE CLASSES AND LEARNING COMPLIANCE SYSTEMS AND METHODS

(71) Applicant: FREEDOM TRAIL REALTY SCHOOL, INC., Boston, MA (US)

(72) Inventor: William Henchy, Boston, MA (US)

(73) Assignee: Freedom Trail Realty School, Inc., Boston, MA (US)

(*) Notice: Subject to any disclaimer, the term of this patent is extended or adjusted under 35 U.S.C. 154(b) by 0 days.

(21) Appl. No.: 16/892,160

(22) Filed: Jun. 3, 2020

Related U.S. Application Data

(60) Provisional application No. 62/856,951, filed on Jun. 4, 2019.

(51) Int. Cl.
*G09B 5/06* (2006.01)
*G06Q 50/20* (2012.01)

(52) U.S. Cl.
CPC .......... *G09B 5/065* (2013.01); *G06Q 50/205* (2013.01)

(58) Field of Classification Search
CPC .............................. G09B 5/065; G06Q 50/205
See application file for complete search history.

(56) References Cited

U.S. PATENT DOCUMENTS

| | | | | |
|---|---|---|---|---|
| 2006/0031083 A1* | 2/2006 | Dalal | ................... | G06Q 50/205 709/204 |
| 2006/0035205 A1* | 2/2006 | Dobson | ................... | G07C 9/28 434/350 |
| 2008/0059484 A1* | 3/2008 | Packard | ................. | G09B 19/00 |
| 2013/0096892 A1* | 4/2013 | Essa | ....................... | G06F 17/18 703/2 |
| 2013/0216990 A1* | 8/2013 | Chu | ....................... | G09B 5/065 434/247 |
| 2014/0317240 A1* | 10/2014 | Handsaker | ....... | H04N 21/47815 709/219 |
| 2015/0154291 A1* | 6/2015 | Shepherd | ................ | G06F 16/95 707/748 |
| 2018/0366017 A1* | 12/2018 | Kenny | ..................... | G09B 5/10 |
| 2019/0110096 A1* | 4/2019 | Shaw | .................. | H04N 21/4223 |
| 2019/0294700 A1* | 9/2019 | Lockwood | .......... | H04L 67/1097 |
| 2019/0325765 A1* | 10/2019 | Wakefield | ................ | G09B 5/04 |
| 2020/0051460 A1* | 2/2020 | Bedor | .................... | G09B 5/065 |

* cited by examiner

*Primary Examiner* — Malina D. Blaise
(74) *Attorney, Agent, or Firm* — Polsinelli PC

(57) ABSTRACT

Systems, methods, and computer-readable media are provided for online learning compliance systems. An example method can include receiving a request including a user identifier (UUID) and associated with a live or on-demand class; based on the request, retrieving course content including streamed content when the request is for the live class and a data object associated with a course, chapter, and/or lesson when the request is for the on-demand class; tracking, based on electronic messages sent to a user terminal, time spent by a user accessing the course content; based on the tracked time, updating a time spent counter in a user record associated with the UUID; and reconciling tracked live time and tracked on-demand time from the time spent counter into a progress value associated with the UUID.

18 Claims, 18 Drawing Sheets

Class Schedule

Upcoming Salesperson License Course Live Online Class Schedule

You can join live online class modules starting ten minutes before their scheduled start time. If you don't see any joinable classes, try refreshing the page. Class topics that you have previously attended are marked with a check (but feel free to retake them if you need a refresher).

1 2 3 4 5

Class Topics
All Topics
Unattended Topics
The Basics
Property Rights
Interests In Real Estate
Limitations On Property Rights
Property Valuation
Contracts
Leases
Transfer Of Property
Real Estate Agency
Fair Housing Law
Introduction To Real Estate Financing

In session
The Real Estate Test
- Today at 1:00 PM EDT
- 1 hours long
- Topics: The Real Estate Test
- Instructors: Jane Doe
- Learn all about the real estate license test, and what you need to know for test day

634A

FHA Financing Lesson
- Today at 3:00 PM EDT
- 0 hours 20 minutes long
- Topics: Test Preparation
- Instructors: John Doe
- Learn all about FHA financing.
  Please give us feedback!

634B

Consumer Protection
- Monday 3/25 at 11:00 AM EDT
- 2 hours 15 minutes long
- Topics: Consumer Protection Laws
- Instructors: Jane Doe and Dr. Smith

634C

Help

Dashboard
Live Class Schedule — 604
Self Guided Study — 606

Real Estate Financing

State Law
- Monday 3/25 at 8:00 PM EDT
- 2 hours 15 minutes long
- Topics: Massachusetts Real Estate Licensing Law
- Instructors: Lisa L.

634D

The Basics
- Tuesday 3/26 at 3:00 PM EDT
- 2 hours 15 minutes long
- Topics: The Basics
- Instructors: Dr. Smith

634E

Property Rights
- Tuesday 3/26 at 6:00 PM EDT
- 2 hours 15 minutes long
- Topics: Property Rights
- Instructors: Jane Doe

634F

Interests In Real Estate
- Wednesday 3/27 at 11:00 AM EDT
- 2 hours 15 minutes long
- Topics: Interests In Real Estate
- Instructors: Jane Doe

634G

Property Right Limitations
- Wednesday 3/27 at 6:00 PM EDT
- 2 hours 15 minutes long
- Topics: Property Right Limitations
- Instructors: Dr. Smith

634F

Property Valuation
- Thursday 3/28 at 11:00 AM EDT
- 2 hours 15 minutes long
- Topics: Property Valuation
- Instructors: Jane Doe

Upcoming Live Online Class Schedule

You can take the entire 40 hour license class as a live online webinar, or mix live webinars and on demand streaming classes to complete the license course on your own schedule. Live class webinars are offered days, nights, weekends, and on demand classes are available 24/7.

672     < 1 2 3 4 5 >     674

680     682

688     690

760

| FTRS Admin | Home | Classes ˅ | Content ˅ | Users ˅ | Business ˅ | Exit |

- List | Create — 770
- Class Type * — 772
- Date * — 774
- Is Finished * — 776
- Topics * — 778

Salesperson License Course

☐ Consumer Protection Laws
☐ Contracts
☐ Fair Housing Law
☐ Government Financing Programs And Regulations
☐ Interests in Real Estate
☐ Introduction To Real Estate Financing
☐ Leases
☐ Massachusetts Real Estate Licensing Law
☐ Practice Test And Review
☐ Limitations On Property Rights
☐ Property Rights
☐ Property Valuation
☐ Real Estate Agency
☐ Real Estate Financing
☐ Test Preparation
☐ The Basics
☐ The Massachusetts Real Estate Test
☐ Transfer Of Property

— 780

- Instructor List * — 782
- Length Hours * — 784

ONLINE CLASSES AND LEARNING COMPLIANCE SYSTEMS AND METHODS

CROSS-REFERENCE TO RELATED APPLICATIONS

This application claims the benefit of, and priority to, U.S. Provisional Patent Application No. 62/856,951 filed on Jun. 4, 2019, entitled "ONLINE CLASSES AND LEARNING COMPLIANCE SYSTEMS AND METHODS", the contents of which are hereby expressly incorporated by reference in their entirety.

TECHNICAL FIELD

The present disclosure relates to tracking user progress across live and on-demand services. In particular, the present disclosure relates to tracking attendance and course completion throughout a program.

BACKGROUND

Online learning has become an increasingly popular and important mode of training, education and certification. Online learning can provide education at a lower cost, increased access to education through remote access, greater flexibility to students, among other benefits. However, managing online learning, such as managing scheduling, managing online content, tracking student course progress, managing compliance, etc., can present greater challenges than traditional learning environments. This is especially true if an online course offers mixed modes of learning, such as live classes and on-demand classes, and/or more complex functionalities, requirements, systems, etc.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which:

FIG. 6B illustrates an example user interface displaying an example live class schedule, in accordance with various embodiments of the subject technology;

FIGS. 7A-D illustrate examples of a user interface for an administrator to manage an online learning system, in accordance with various embodiments of the subject technology;

DETAILED DESCRIPTION

Figure 1:
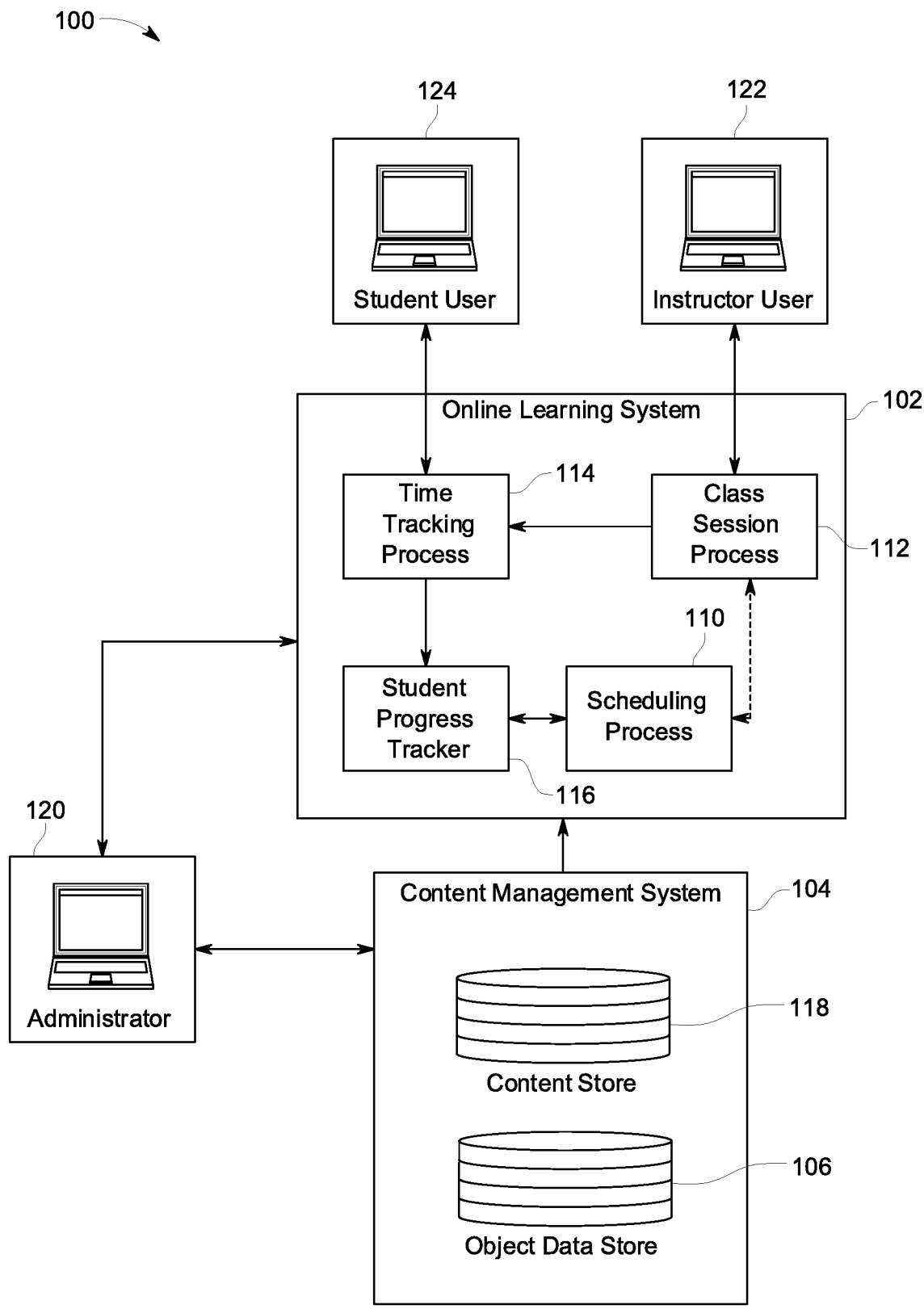
FIG. 1 illustrates an example system for online learning, in accordance with various embodiments of the subject technology.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The disclosed technologies can provide online educational and training courses and programs to make education and training more convenient and accessible. For example, a user, such as a student or professional, may participate in live (e.g., real time, livestreaming, etc.) or on-demand online courses. In live online courses, the course contents are broadcast over the Internet at a scheduled time and/or with a live instructor, and the user engages with the course content as it is being broadcast. For on-demand online courses, the course content is prepared and published online for the users to select and complete whenever they choose.

The disclosed technologies can provide different online course formats, which can offer different benefits to the user. For example, live online courses encourage user engagement and interaction, as the users may ask questions and have discussions with the instructor or with other users. On-demand online courses offer flexibility in course pacing and scheduling, and are able to incorporate course materials from various media types (e.g., video lectures, text content, interactive quizzes, etc.). In some cases, a user may wish to complete a course using a combination of the two formats. As an example, a user taking courses for realtor licensing may want to take a certain number of hours of live courses to establish some level of competence under a live instructor, but may want to complete the rest of the course material on-demand for more scheduling flexibility.

The disclosed technologies can provide users flexibility to mix and match live and on-demand classes, courses, programs, etc., at the user's discretion or preference. Moreover, the disclosed technologies can automatically reconcile the user's progress through combined live and on-demand classes, courses, programs, etc. Rather than progress being predefined and inflexibly accounted for, the approaches herein can track time and progress across different course formats, such as live and on-demand formats, and can reconcile the time and progress across the different course formats to allow users to combine different formats and obtain credit for time and progress made in any course format.

In some examples, credit for online courses can be given on the basis of course time (potentially including specific requirements and/or limitations for live courses and/or on-demand courses), course load completion, and/or other requirements, preferences, rules, etc. Moreover, user progress can be tracked and related to various respective activities to ensure compliance with, for example and without limitation, licensure rules and the like. User progress can be tracked based on time spent by the user in a course accessed by the user through an on-demand format, a live format, or both. In some examples, time spent by the user in a live class and on-demand format can be tracked and reconciled to calculate an overall progress for the user that accounts for time spent in both the live class and on-demand formats.

While the present disclosure is described in various places with reference to real estate licensing courses, it should be appreciated by those of skill in the art that the disclosure has broader applications such as, for example and without limitation, other training, licensing, educational, social, coaching, and/or structured programs, courses, curricula, etc.

Generally, a user object data store may store a unique user object for each user. The user object data store may include or be implemented by a server, cloud provided storage solution, distributed database or storage system, data center, and/or other content storage solution. This user object contains identifying information for the referenced user. This information may include name, username, password, etc. This user object may also include a group identification field that identifies this user with different groups that have different levels or types of access to the system. For example, a user may be a student, instructor, and/or an administrator. A student can take courses and track their course completion progress through an online system as described herein. An instructor can publish and broadcast course content through the online system as described herein. An administrator can make modifications to the system. In certain situations, a user may belong to multiple groups. For example, a user may be both an instructor and an administrator. An example implementation of the user object is given below in Table 1.

TABLE 1

Example user objects ("Example User").

```
{
  "_id": }
    "$oid": "1"
  },
  "email": "email@email.com",
  "name": "Jane Doe",
  "password": "$saltedpasswordhash",
  "created": {
    "$date": "04-01-2019"
  },
  "active": true,
  "roles": [
    "student"
  ],
  "last_login": {
    "$date": "04-01-2019"
  }
}
```

Each student user object is associated with at least one progress object, a kind of user record. A student may be associated with multiple progress objects if the student is undertaking multiple courses. For example, in realtor licensing, a student may take multiple courses to become licensed in multiple states. As different states have different licensing requirements, courses may have correspondingly different topic requirements and/or completion requirements, such as live class attendance, total time spent in class, etc. Separate progress objects may track user progress in each course.

Progress objects contain one or more fields which may track a user progress for each course completion requirement. In the example of realtor licensing courses, the progress object may contain fields for classes completed, topics covered, time spent in live classes, time spent in on-demand classes, total time spent on the course, etc. Separate time spent counters can exist for each of the categories of time spent. Each progress object may also contain additional information such as user activity logs and last update time for this progress object. An example implementation of a user progress object is given in Table 2.

TABLE 2

Example progress object for student user ("Example Progress").

```
{
  "_id": {
    "$oid": "2"
  },
  "created": {
    "$date": "04-01-2019"
  },
  "user": {
    "$oid": "userReference"
  },
  "payment_date": {
    "$date": "04-01-2019"
  },
  "class_type": "ma-salesperson",
  "live_class_access": true,
  "self_ study_access": true,
  "course_access_hours": 40,
  "class_time": 0,
  "async_study_time": 0,
  "total_time": 0,
  "live_class_attendance":
    [
      {"$oid": "liveClassSessionReference"}
    ],
  "on_demand_progress": {
    "property-rights": {
```

TABLE 2-continued

Example progress object for student user ("Example Progress").

```
        "real-property": {
            "date": {"$date": "04-01-2019"},
            "completed": true
        },
        "completed": false
        }
    },
    "topics_attended": {
        [
            "the-basics"
        ],
        "completed_course": false,
        "last_update": {"$date": "04-01-2019"},
        "activity_log": []
    }
}
```

Each progress object is updated correspondingly when the user uses the system. Specifically, student user access to classes may be based on, for example, the "class_type" variable associated with a curriculum and/or jurisdiction, and access Booleans "live_class_access" and "self_study_access" denoting whether the student user is able to access particular class types (e.g., live class, on-demand classes, etc.). In addition, details of access to live classes can be further tracked in a "live_class_attendance" data structure stored within the progress object. The "live_class_attendance" data structure can hold various data such as reference information, attended topics, course completion flags, update records, and activity logs.

In particular, an "on_demand_progress" data structure can store tracked time for particular on-demand classes as well as lessons, chapters, and other constituent sections of the particular course. Here, for example, a property rights class includes a real property lesson and associated lesson completion information (e.g., "date" and "completed" data structures). While a real property lesson is completed (e.g., a respective "completed" variable is set to "true"), the overall chapter (e.g., "property-rights" data structure) is incomplete (e.g., associated with a respective "completed" variable set to "false").

Class attendance time can be granularly tracked in order to comply with any requirements, such as licensure requirements (e.g., State Department of Professional Licensure, etc.). In one example, a professional license (e.g., real estate broker license, etc.) may require no more than 19 hours of on-demand courses and 40 hours total class time (e.g., 21 hours live). Accordingly, tracked time spent on a class can be categorized, either implicitly or explicitly, as "live" class time or "on-demand" class time.

Live classes are broadcast at specific times. These broadcast times are predetermined by the instructors, and are made available to the students through a graphical user interface ("GUI"). Students may be required to attend these courses online as the class is being broadcast by the instructor to receive credit for live class completion.

The system may verify the user's completion of the requirements in various ways. In one example, the user's device may send a data packet via one or more networks, such as the Internet, to the system server at certain time intervals (e.g., random intervals, predefined intervals, etc.) as the student is using the system to view a live class broadcast. When the system server receives the data packet from a user, it logs the time that the packet was received. Once multiple data packets have been received by the system server, the system may compare the last-received time to the first-received time to calculate the user's attendance time for the current live class. In some examples, a client side process tracks the user's attendance time concurrent to the system server tracking. The client side process may report tracked time to the system server and both the system server tracking time and client side tracked time may be compared to determine a correct time tracking before logging. As a result, client side manipulation of tracking may be avoided. Once the student has been determined to have attended this class for a sufficient amount of time (e.g., an in-class attendance minimum, etc.) the system may update the student's corresponding progress object to show that the user has completed the respective live class. The in-class attendance minimum can be predetermined and, in some examples and without imputing limitation, may be based on a respective local jurisdiction, a specific program, a specific institution, and the like. For example, a state realtor licensure may require students to attend a proportion of classes in a "live" (e.g., via live stream, etc.) or may require a certain number of hours of a particular class or topic to be attended to in a live setting by a student in order to receive credit.

On-demand classes can be managed through a Content Management System (CMS). Typically, on-demand classes can incorporate video content, text content, image content, and/or interactive content. In an example, the video content may be a recording of a live version of the class. This recording may be edited into smaller segments such that other types of class content may be integrated between each lesson. If there are multiple video recordings from multiple live offerings of this class, an administrator may select one or more of these recordings to be used in the on-demand version of the class. Alternatively, specifically recorded video content from a source other than a live version of the class may be included, and content from other online sources may be embedded by an administrator in the on-demand class content as well.

As mentioned above, on-demand classes may include multiple lessons. Each lesson itself may contain video content, text content, image content, and/or interactive content. In one example, this interactive content may be a collection of quiz questions, and a student may be required to achieve some predetermined threshold percentage of correctness to receive credit for the class. In another example, the interactive content may include a collection of exercise problems for which the student's performance level is not determinate of course completion. An example lesson object is given below in Table 3.

TABLE 3

Example lesson object for an on-demand class ("Example Lesson").

```
{
    "name": "Lesson",
    "description": "A educational lesson, representing one section of a chapter.",
    "displayField": "internalTitle",
    "fields": [
        {
            "id": "internalTitle",
            "name": "Internal Title",
            "type": "Symbol",
            "validations": [
                {
                    "unique": true
                }
            ],
            "required": true
            . . .
```

TABLE 3-continued

Example lesson object for an on-demand class ("Example Lesson").

```
    },
    {
      "id": "title",
      "name": "Title",
      "type": "Symbol",
      "localized": true,
      . . .
    },
    {
      "id": "slug",
      "name": "Slug",
      "type": "Symbol",
      . . .
    },
    {
      "id": "modules",
      "name": "Modules",
      "type": "Array",
      . . .
    },
    {
      "id": "attachments",
      "name": "Attachments",
      "type": "Array",
      . . .
    },
    {
      "id": "showOnlyIn",
      "name": "Show Only In These Courses",
      "type": "Array",
      . . .
    }
  ]
}
```

One or more classes can be organized into a respective chapter of an on-demand class. In one example, a chapter object (e.g., associated with a respective chapter of an on-demand class) may reference a quiz object for which the student's performance may affect respective completion statuses (e.g., for particular students, etc.) of the class. An example lesson object is shown below in Table 4.

TABLE 4

Example chapter object for an on-demand class ("Example Chapter").

```
{
  "name": "Chapter",
  "description": "A series of lessons designed to teach a particular
topic or topics.",
  "displayField": "title",
  "fields": [
    {
      "id": "title",
      "name": "Title",
      "type": "Symbol",
      "localized": true,
      . . .
    },
    {
      "id": "slug",
      "name": "Slug",
      "type": "Symbol",
      . . .
    },
    {
      "id": "topics",
      "name": "Topics",
      "type": "Array",
      . . .
    },
    {
      "id": "image",
      "name": "Image",
```

TABLE 4-continued

Example chapter object for an on-demand class ("Example Chapter").

```
      "type": "Link",
      . . .
    },
    {
      "id": "shortDescription",
      "name": "Short Description",
      "type": "Symbol",
      "localized": true,
      . . .
    },
    {
      "id": "description",
      "name": "Description",
      "type": "Text",
      "localized": true,
      . . .
    },
    {
      "id": "duration",
      "name": "Duration",
      "type": "Integer",
      . . .
    },
    {
      "id": "lessons",
      "name": "Lessons",
      "type": "Array",
      . . .
    }
  ]
}
```

As shown in the Example Lesson and the Example Chapter above, lessons and chapters may reference topics that are covered by these objects. The user's progress object may be updated to include these completed topics after completion of the corresponding lesson or chapter. An example topic object is shown below in Table 5.

TABLE 5

Example topic object ("Example Topic").

```
{
  "name": "Topic",
  "description": "Class topics covered by a course or lesson.",
  "displayField": "title",
  "fields": [
    {
      "id": "title",
      "name": "Title",
      "type": "Symbol",
      "localized": true,
      "required": true,
      . . .
    },
    . . .
    {
      "id": "slides",
      "name": "slides",
      "type": "Link",
      . . .
    },
    {
      "id": "quiz",
      "name": "Quiz",
      "type": "Link",
      . . .
    }
  ]
}
```

The required and optional topics for the completion of each course are referenced by each course object. The course object may also reference one or more chapters and lessons that it consists of. The course object may also reference additional information, including additional requirements for the completion of the course, or other relevant information that may be useful for the student or for the operation of the system. In the realtor licensing example, each course object may also reference a respective jurisdiction (e.g., country, state, etc.) with which the course may be associated. An example course object is shown below in Table 6.

TABLE 6

Example course object ("Example Course").

```
{
  "name": "Course",
  "description": "A series of topics, chapters, and lessons designed to
   teach a particular subject or subjects.",
  "displayField": "title",
  "fields": ]
    {
      "id": "title",
      "name": "Name",
      "type": "Symbol",
      "localized": true,
      "required": true,
      . . .
    },
    {
      "id": "slug",
      "name": "Slug",
      "type": "Symbol",
      . . .
    },
    {
      "id": "usaState",
      "name": "USA State",
      "type": "Symbol",
      . . .
    },
    {
      "id": "image",
      "name": "Image",
      "type": "Link",
      . . .
    },
    {
      "id": "shortDescription",
      "name": "Short Description",
      "type": "Symbol",
      "localized": true,
      . . .
    },
    {
      "id": "description",
      "name": "Description",
      "type": "Text",
      "localized": true,
      "required": true,
      . . .
    },
    {
      "id": "duration",
      "name": "Required Time",
      "type": "Integer",
      . . .
    },
    {
      "id": "asyncTimeLimit",
      "name": "Asynchronous Class Time Limit",
      "type": "Integer",
      . . .
    },
    {
      "id": "requiredTopics",
      "name": "Required Topics",
      "type": "Array",
      . . .
    },
    {
      "id": "optionalTopics",
```

TABLE 6-continued

Example course object ("Example Course").

```
      "name": "Optional Topics",
      "type": "Array",
      . . .
    },
    {
      "id": "chapters",
      "name": "Chapters",
      "type": "Array",
      . . .
    },
    {
      "id": "studyGuideUrl",
      "name": "Study Guide Url",
      "type": "Symbol",
      . . .
    },
    {
      "id": "liveClasses",
      "name": "Live Classes",
      "type": "Boolean",
      . . .
    },
    {
      "id": "tutoring",
      "name": "Live Tutoring",
      "type": "Boolean",
      . . .
    },
    {
      "id": "hasJobBoard",
      "name": "Has Job Board",
      "type": "Boolean",
      . . .
    },
    {
      "id": "practiceTests",
      "name": "Practice Tests",
      "type": "Boolean",
      . . .
    },
    {
      "id": "examCramSections",
      "name": "Exam Sections",
      "type": "Array",
      . . .
    }
  ]
}
```

In some examples, an online learning system can be used to manage the on-demand class content. The content and the organization of the on-demand classes may be accessed and/or modified by an administrator user via a graphical user interface. In some examples, the online learning system may include one or more databases hosted on one or more servers or the like. For example, the online learning system can include a content management system (CMS) that hosts content and/or databases for course content, metadata, course requirements, etc., as further described herein. In some examples, the online learning system may be provided over a cloud environment such as via cloud storage solutions, etc.

A graphical user interface may be generated and presented to a user to allow the user to navigate through the processed image of the image document. Navigation may be based on category and subcategory where the user interface automatically scrolls to the location in the document where the associated text is located, or the text may be selected to cause the user interface to identify to the category and/or subcategory to which the text pertains. Categories and subcategories generally refer to provisions and components of provisions of a transactional document. A category may encompass one or more subcategories, and a subcategory may be related to more than one category.

FIG. 1 illustrates an example online learning environment 100, in accordance with various embodiments of the subject technology. The online learning environment 100 includes an online learning system 102. The online learning system 102 can host online programs and content, such as courses, trainings, certification programs, licensing programs, etc. Moreover, the online learning system 102 can manage schedules, programs, users enrolled or participating in programs, instructors, program requirements, etc. The online learning system 102 can also track time spent by a student attending live classes and on-demand classes, track program progress (e.g., based on time spent and/or any other parameters), generate program schedules, predict program completion schedules/times, etc., as further described herein.

Student users may access the online learning system 102 through student device 124, which can include a remote terminal such as, for example and without limitation, a laptop, desktop, mobile device, smartphone, smart wearable device (e.g., head-mounted display, smart glasses, etc.), tablet computer, and the like. Student users can manage respective student accounts, attend live classes (e.g., livestreamed, etc.), access on-demand content (e.g., recorded classes), leave course and/or content reviews, participate in content (e.g., quizzes, tests, etc.), review or modify a program schedule, etc. Likewise, instructor users may access the online learning system 102 through instructor device 122, which can be a remote terminal such as, for example and without limitation, a laptop, desktop, mobile device, smartphone, tablet computer, smart wearable device, and the like. Instructor users may access and/or modify a class page, retrieve content (e.g., student quizzes, homework, tests, etc.), and teach live classes via video conferencing, etc.

The tracked time may be monitored and credited by time tracking process 114. The time tracking process 114 can track and credit time based on one or more factors or requirements such as, for example and without limitation, jurisdictional requirements (or other preferences and/or requirements) for professional course requirements (e.g., realtor licensure requirements, etc.), as specified by the course provider, subject matter requirements, industry requirements, certification requirements, and/or other standards, preferences, and/or requirements. Where tracked on-demand attendance time for a course has reached a threshold (e.g., as defined by the jurisdictional requirements, etc.), the online learning system 102 can automatically deny or accept class attendance or course completion credit for the respective course.

For example, a jurisdiction may provide credit for a maximum of one hour of on-demand attendance for a particular course. As a result, online learning system 102 may track on-demand attendance up to an hour for an attending student. Once an hour of on-demand time has been credit to the attending student, online learning system 102 may provide only live class time credit to the student. Additionally, the student may be alerted when the on-demand time threshold has been reached and can attend live classes for the remainder of the course or curriculum. In some examples, an automated scheduling process can update a student schedule based on the tracked time (e.g., on-demand thresholds, student calendar, etc.) when the threshold is reached without requiring direct scheduling input from the student.

Student progress through classes and/or a program curriculum may be tracked by student progress tracker 116. Student progress tracker 116 can be updated by time tracking process 114 and may store and/or retrieve data (e.g., student objects, course objects, etc.) in/from object data store 106. Scheduling process 110 may generate and/or update a student schedule of classes based on student progress tracker 116. On-demand courses (e.g., course objects, etc.) can be retrieved from a content store 118 on a content management system (CMS) 104 in response to a student user request for an on-demand course and, in some examples, via a topic or course object. Live classes (e.g., real-time or live classes streamed) may be stored as class sessions in a shared data store with user objects.

Class session process 112 can manage real-time or live streaming sessions (e.g., video, audio, etc.) connecting the instructor user to one or more student users in a live class. In some cases, the CMS 104 (e.g., via content store 118) can store the real-time or live streaming content and/or session information. Moreover, the class session process 112 can interact with the CMS 104 to manage streams, provide and/or manage streaming content, etc. In some examples, the class sessions may include a reference to a topic object (e.g., stored in CMS 104) and timing information for providing the connection between instructor users and respective student users. In effect, the topic object, by being referenced by on-demand sessions and/or class sessions, can serve as a link between tracked on-demand time and tracked live class time in order to reconcile tracked time (as further discussed below).

Course content provided to student users (as livestream video or on-demand video) may be processed by time tracking process 114 as discussed above. In particular, time tracking process 114 may periodically and/or on a randomized basis ping or send an electronic reachability message to each respective student user via student devices 124 to ensure physical attendance to the class by the student user. For example, time tracking process 114 may check an activity monitor on the student user device. If activity is detected over a threshold amount of time (e.g., a half hour, etc.), time tracking process 114 may update student progress tracker 116 with credit for the threshold amount of time spent attending a respective class.

In some examples, an administrator 120 may access the online learning system 102 to manage course content, student user accounts, instructor user accounts, and the like. Administrator 120 may access online learning system 102 through an administrator interface or can directly access CMS 104 to add, modify, or delete course objects and the like. Likewise, the administrator user can directly access the user object data store to add, modify, or delete student object, progress objects, and the like.

Figure 2:
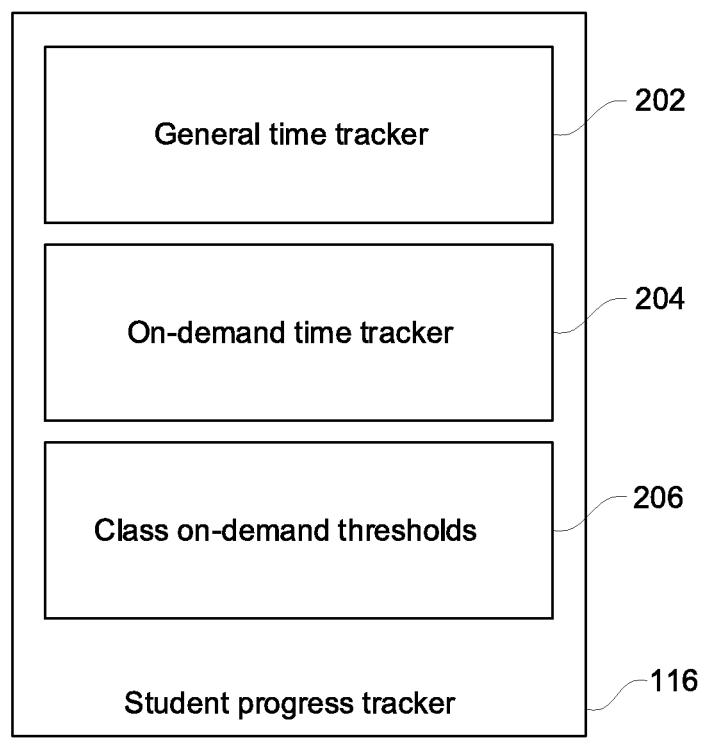
FIG. 2 illustrates an example student progress tracker process, in accordance with various embodiments of the subject technology.

In some examples, the CMS 104 can be part of, or implemented by, the online learning system 102. In other examples, the CMS 104 can be separate from the online learning system 102 and/or implemented by one or more separate computing systems. Moreover, in some examples, the data store 106 and content store 118 can both be part of, or implemented by, the CMS 104 and/or the online learning system 102. In other examples, the data store 106 and/or the content store 118 can be separate from the CMS 104 and/or the online learning system 102 and/or implemented by one or more separate computing systems FIG. 2 illustrates an example student progress tracker process, in accordance with various embodiments of the subject technology. Student progress tracker 116 resides in, is hosted by, is implemented by, and/or is part of, online learning system 102 and can track the progress of students throughout courses.

Student progress tracker 116 includes general time tracker 202 for tracking overall time spent by a respective student user attending courses through online learning system 102. On-demand time tracker 204 tracks time spent by the respective student user accessing on-demand course content and can access class on-demand thresholds 206 to determine whether on-demand course attendance thresholds have been reached. On-demand course attendance thresholds can include, for example and without limitation, a time thresholds for progress/attendance of on-demand courses, content thresholds (e.g., amount of content accessed, reviewed, completed, etc.), user activity thresholds, etc.

In some examples, student progress tracker 116 transmits data with downstream systems and/or processes. For example, when the on-demand time tracker 204 determines a threshold amount of time has been spent by the user student accessing on-demand course content, the student progress tracker 116 may interface with a downstream system to alert the student user, an instructor user, and/or an administrator user.

Figure 3:
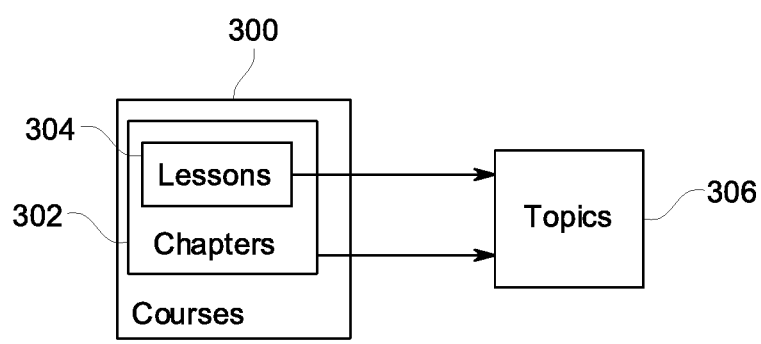
FIG. 3 illustrates an example course data object, in accordance with various embodiments of the subject technology.

FIG. 3 illustrates an example course data object, in accordance with various embodiments of the subject technology. In one illustrative example, course 300 contains information about chapters and lessons, and can send this information to course topic objects. In other examples, courses 300 can contain other information such as, for example and without limitation, instructions, guides, tests, manuals, course materials, course preferences, and/or any other course content.

Courses 300 may include a series of data objects, including chapter data objects and lesson data objects. These data objects can be related, as each chapter 302 may include a series of lessons 304. In some examples, a particular lesson 304 can be accessible by iterating from a respective course 300 through a respective chapter 302 and/or directly through a linkage to an outside topic data object, such as topic 306 (which may also provide navigation to other lessons and one or more chapters). Topic 306 may also be referenced by a live class and, for example, may be used to categorize the live class or the like. In some examples, lessons 304 may include video (e.g., recorded lectures, etc.), audio, text content, and/or any other form of digital content. In some examples, lessons 304 may include interactive content such as quizzes, surveys, tests, etc. In some examples, lessons 304 may include supplement content such as slide decks, documents, PDFs, images, embedded content, video, etc.

Figure 4:
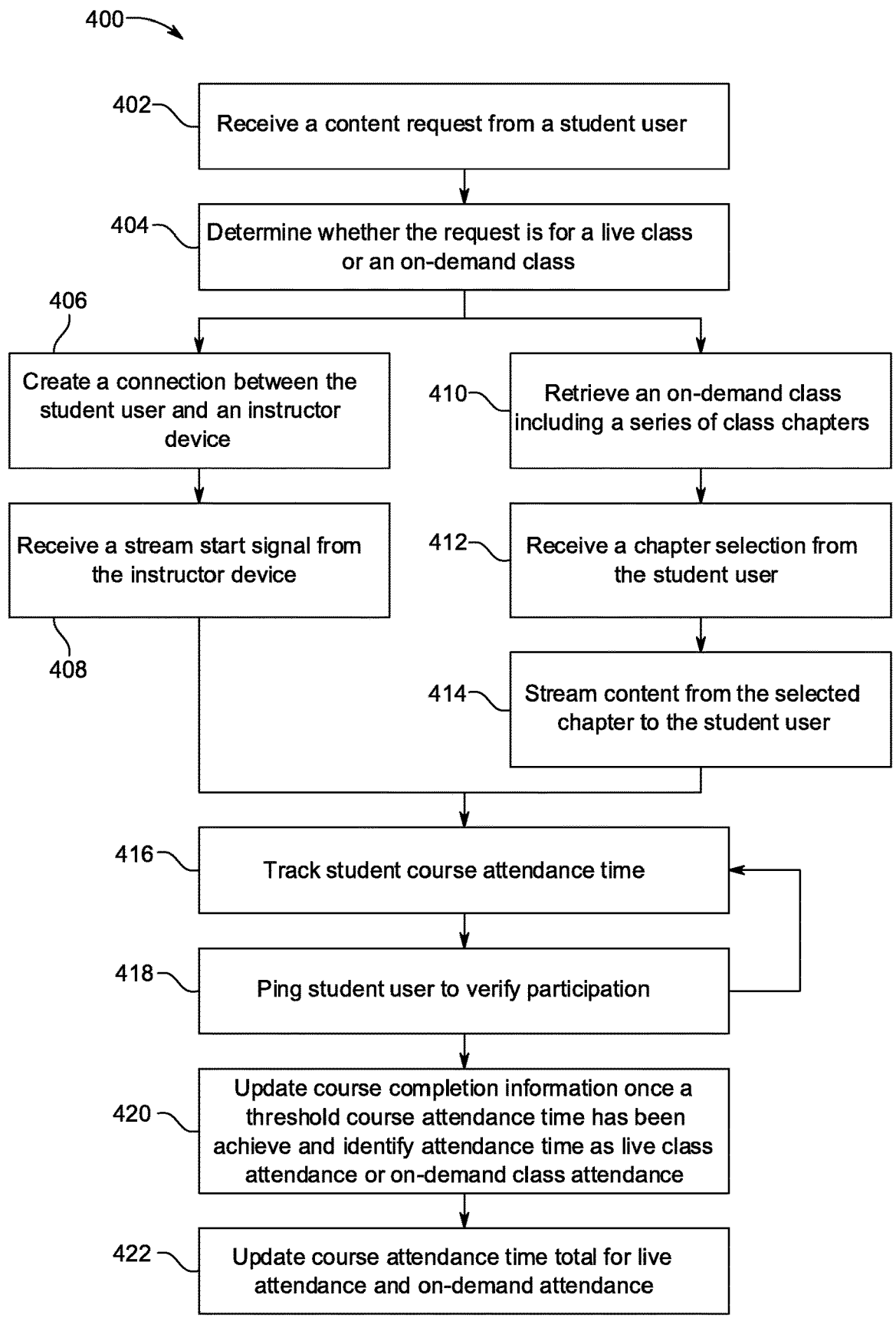
FIG. 4 is a flowchart illustrating an example method for delivering course content, in accordance with various embodiments of the subject technology.

FIG. 4 is a flowchart illustrating an example method 400 for delivering course content, in accordance with various embodiments of the subject technology. At block 402, the method 400 can include receiving a content request by online learning system 102 from student device 124. The content request may involve selecting or joining a topic, logging into a live on-demand classroom, downloading course materials, a request to access content, etc.

At block 404, online learning system 102 determines whether the request is for a live class or an on-demand class. Determination of class type can be done based on information included in the content request, contextual information (e.g., a calling service identifier, a user identifier, type of access request, content session information, etc.), etc. Where the content request is for a live class, at block 406 a connection is created between student device 124 and instructor device 122. In some examples, the connection includes a video, audio, and/or multimedia stream from instructor device 122 to student device 124 (e.g., to a desktop, laptop, mobile device, smartphone, etc.). In some examples, the connection includes a video stream (e.g., for the instructor to visually determine attendance) and/or to other students participating in the class.

At block 408, a stream start signal is received from instructor device 122. The stream start signal may be a manual toggle from the instructor user to indicate class start or may automatically trigger at a certain time, upon the instructor user connecting to a class session or access a class content or portal, or based on any other triggering event.

Where the content request is for an on-demand class, at block 410, a respective on-demand class is retrieved. The on-demand class can include any class content. In some examples, the on-demand class includes a series of chapters. At block 412, online learning system 102 receives a chapter (or other content, section, etc.) selection from the student user (e.g., via student device 124), and at block 414 the selected chapter and associated content can be provided to the student device 124 (e.g., from online learning system 102, instructor device 122, etc.). In some examples, the selected chapter and associated content can be served to the student user's device via the online learning system 102.

In other examples, the selected chapter and associated content can be streamed to the student user's device via the online learning system 102 (e.g., from one or more media streaming servers, software containers, virtual machines, content delivery systems, and/or any other component of the online learning system 102) or via the instructor device 122 via a peer-to-peer connection or streaming media server. In yet other examples, the selected chapter and associated content can be streamed from the instructor device 122 to the online learning system 102 and then from the online learning system 102 to the student user's device. In some cases, the selected chapter and associated content can be streamed to the student user's device using one or more streaming and/or networking protocols such as, for example and without limitation, HTTP Live Streaming (HLS), Web Real-Time Communication (WebRTC), Real-Time Streaming Protocol (RTSP), Real-Time Transport Protocol (RTP), peer-to-peer protocols, and/or any other networking protocols.

At block 416, student attendance time is tracked throughout the streamed and/or on-demand content/session. Tracking may be performed server side (e.g., by time tracking process 114, etc.) and/or client side (e.g., by student device 124). At block 418, at random intervals (or predefined intervals), the student user (e.g., student device 124) is pinged to verify participation and the time is tracked where the ping indicates student participation. For example, the online learning system 102 can ping the student device 124 to measure, detect, and/or monitor student access, participation, activity, etc., and track time for the student.

At block 420, based on a certain threshold of tracked time (e.g., based on jurisdiction, predetermined by an administrator or instructor, based on course requisites, etc.), course completion information for a respective course is calculated and/or updated. The tracked time is identified as live class time, on-demand class time, or both, which can be based on a determination made by online learning system 102. The tracked time can be labeled as live class time or on-demand class time. Moreover, the labeled tracked time can be reconciled by student progress tracker 116 to determine an overall progress for the student user.

In some embodiments, reconciling labeled tracked time can include adding live class time and on-demand class time or generating a weighted sum of live class time and on-demand class time. In some embodiments, reconciling labeled tracked time can include accounting for live class time and on-demand class time which covered overlapping material. For instance, suppose a student user attended a live class covering a certain topic, and subsequently reviewed the material with an on-demand class. Reconciling labeled tracked time can involve refraining from counting both live class and on-demand class times when they cover the same material. Instead, the total tracked time may only count for the non-overlapping time from the live class and on-demand class times. In other examples, when reconciled, tracked time can be allowed to credit or include overlapping time from live class and on-demand class times.

At block 422, course attendance time totals for the student user (e.g., stored within a student object) are updated for live attendance and/or on-demand attendance. These objects can be stored in object data store 106 for future consumption by online learning system 102 or review by administrator 120. Moreover, the course attendance time totals can be maintained and used to manage course/program progress, scheduling information, certification information, completion information, registration information, course materials/content, course requirements, etc.

Figure 5:
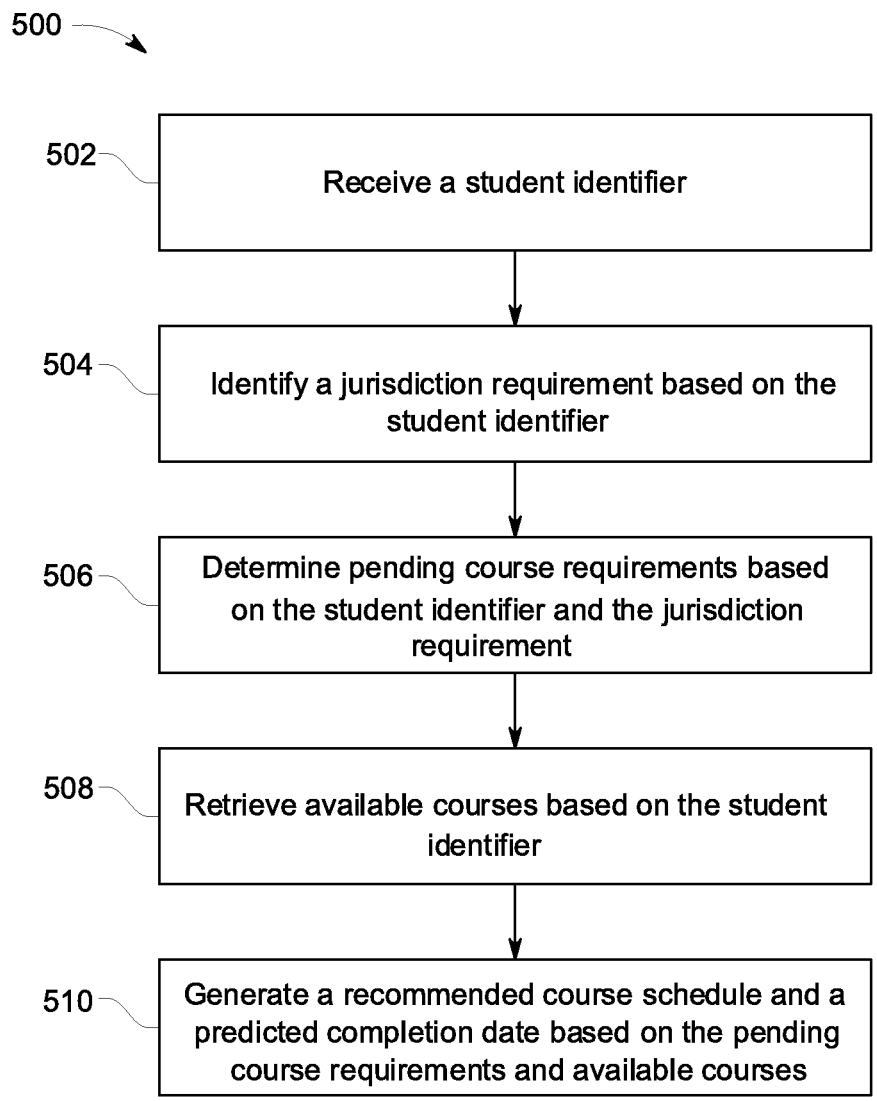
FIG. 5 is a flowchart illustrating an example method for generating a course schedule, in accordance with various embodiments of the subject technology.

FIG. 5 is a flowchart illustrating an example method 500 for generating a course schedule, in accordance with various embodiments of the subject technology.

At block 502, a student identifier is received (e.g., via online learning system 102). For example, a scheduling process (e.g., at online learning system 102) may receive the student identifier from a student user device as part of a student request to generate a schedule and predicted completion time or as part of a downstream process (e.g., automatically generating a schedule and predicted completion time based on updated course progress information, etc.). As another example, the student identifier can be received when a student accesses the online learning system 102 through a user device or requests to access one or more portions of the online learning system 102.

At block 504, a source of course requirements is identified based on the student identifier. In some cases, the source of course requirements can include a jurisdiction. For example, an associated student object stored in object data store 106 may contain relevant jurisdiction information and can be accessed based on the student identifier. To illustrate, in some examples the jurisdiction can be identified by querying the object data store 106 using the student identifier. In other examples, the source of course requirements can include a set of industry requirements, instructor requirements, system requirements, licensing requirements, certification requirements, company requirements, institution requirements, requirements from a standards body, administrator requirements, etc.

At block 506, pending course requirements can be determined based on the student identifier and the identified source of course requirements. For example, an accessed student object may include or reference a course progress record or object. Based on the accessed progress record and the source of course requirements, completed and remaining requirements for completion (e.g., for licensure, accreditation, etc.) can be determined.

At block 508, available courses can be determined based on the student identifier. In some examples, course availability for the student may be based on account levels (e.g., subscriptions, etc.), geographical location, jurisdiction, curriculum type, student enrollment, a student history, course schedules, prerequisites, etc.

At block 510, a recommended course schedule and predicted completion date can be generated based on the available courses and the pending course requirements. In some examples, multiple schedules and associated completion dates can be generated to provide a plurality of options to the student. Moreover, in some examples, the online learning system 102 can analyze the source of course requirements identified based on the student identifier, the available courses determined based on the student identifier, information about the available courses (e.g., timing information, scheduling information, requirements, etc.), scheduling information, preferences, rules/criteria, student information, and/or any other information to determine a recommended course schedule and predicted completion date.

FIGS. 6A-E illustrate example user interfaces displaying a dashboard, live class schedule, on-demand class and associated chapters, chapter lessons, and upcoming schedule, in accordance with various embodiments of the subject technology. In some examples, the user interface can be served or provided by online learning system 102 and displayed by student device 124, as described in FIG. 1. Through the user interfaces, users in the system can access respective information, access various system features and/ or functionalities, access (e.g., view, download, stream, etc.) content, collaborate, upload content, etc.

Figure 6A:
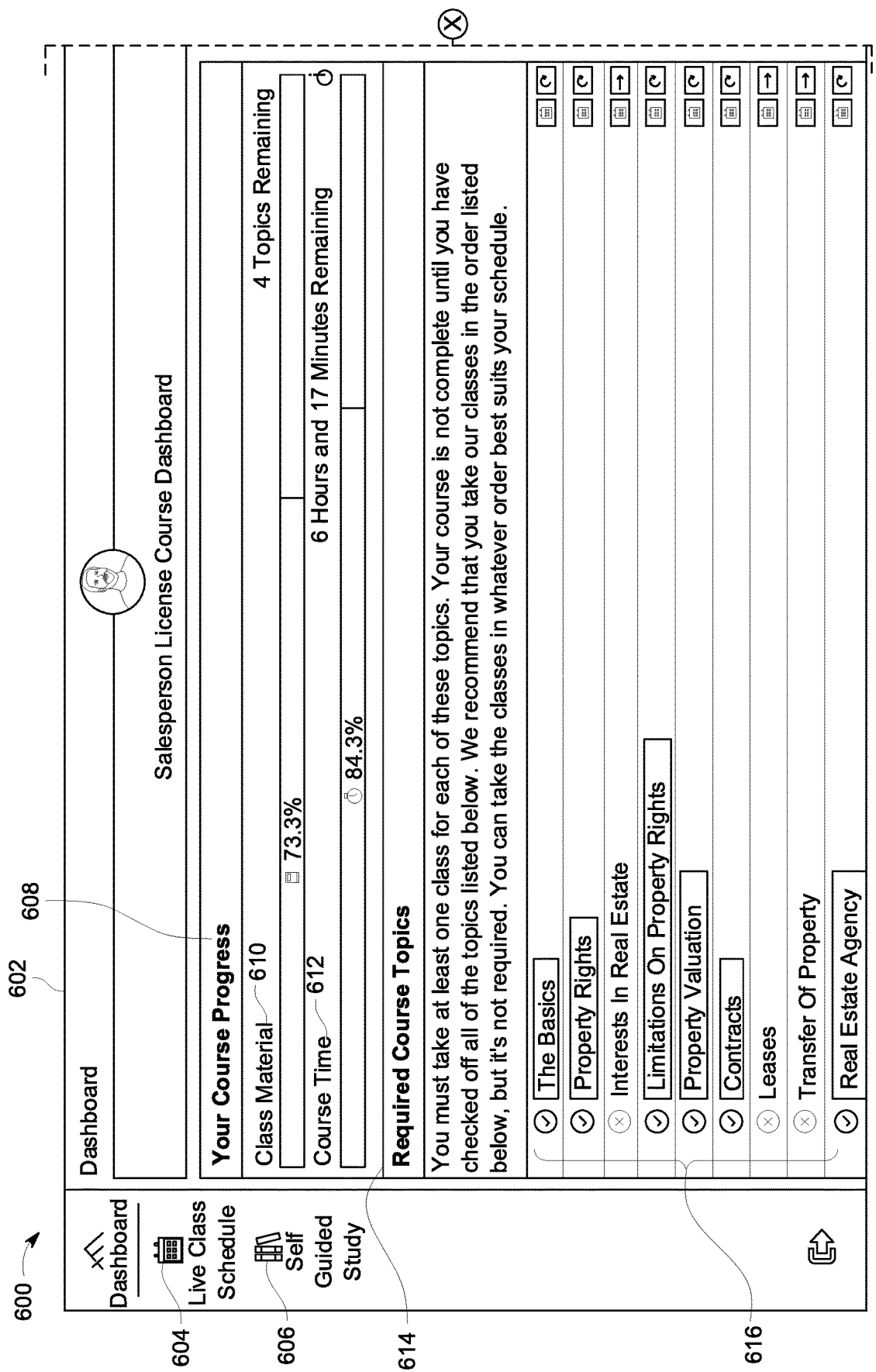
FIG. 6A illustrates an example user interface displaying an example dashboard associated with an online learning system, in accordance with various embodiments of the subject technology.
Figure 6A:
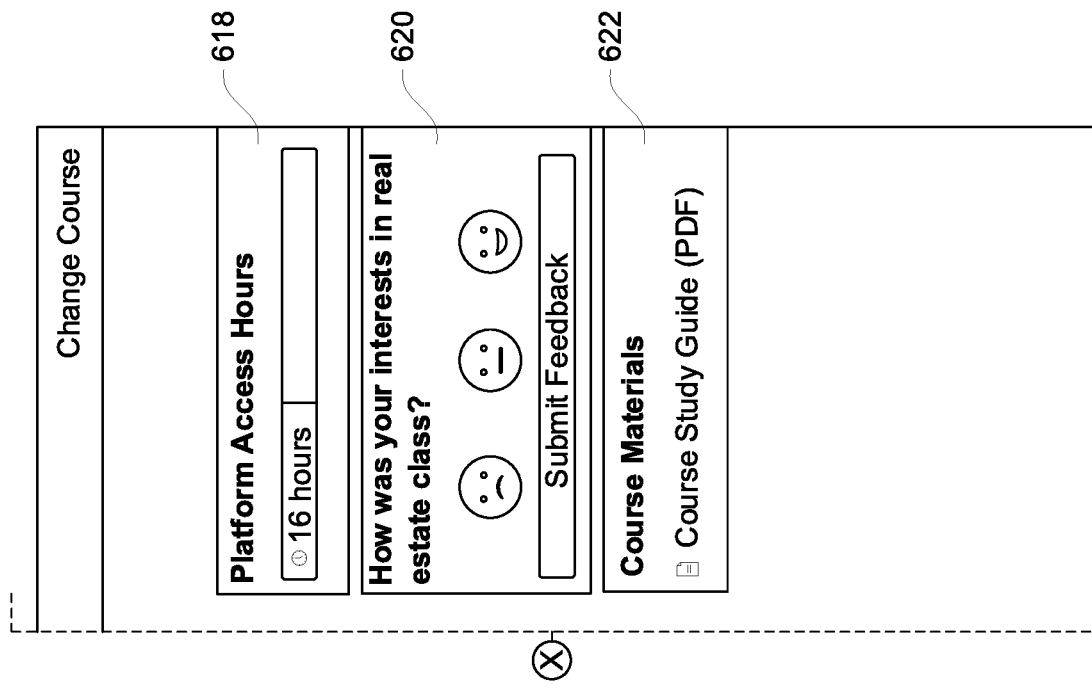

FIG. 6A depicts a dashboard view 602 of the user interface 600 through which a student may access a dashboard associated with the online learning system 102 (and associated content and functionalities). In this example, the dashboard view 602 depicts a dashboard where a student can review course progress (e.g., retrieved from a student object, etc.) information. The user interface can display the course progress information in any format or display configuration. In the example shown in FIG. 6A, the course progress information is displayed in summary view and as line items in a list view.

On the sidebar, live class schedule 604 can display a schedule of when on-demand classes are available for a given course, such as a salesperson license course. Self-guided study 606 can display a schedule, plan, and/or content for self-guided study through the course. In this example, the user interface 600 is shown and described herein with respect to a salesperson license course. However, the salesperson license course is merely provided as a non-limiting example for explanation purposes. As previously noted, one of ordinary skill in the art will recognize that the technologies and features described herein can apply to, and/or be implemented in, a variety of other contexts and/or applications, such as other training programs, educational programs, courses, materials, structured programs, certificate programs, projects, etc.

Course progress 608 contains information tracking the progress of the student user through the course, such as the salesperson license course. Class material 610 tracks a progression through class material, including chapters read, tests taken, etc. Course time 612 tracks temporal requirements, such as hours needed in real-world experiences to obtain certification. Required course topics 614 list topics a student user needs to study to complete the requirements of the offered course.

Platform access hours 618 tracks the amount of time that a student user has spent utilizing online learning system 102. Feedback 620 elicits and/or enables feedback from the student user on their course experience. Course materials 622 displays relevant course materials, such as study guides, syllabi, examples, tests, videos, reference materials, or other documents and/or materials.

FIG. 6B depicts a tailored live class schedule view 630 of user interface 625. The live class schedule view 630 can provide one or more schedules for one or more live online classes (e.g., upcoming and/or in session) and any associated information. In this example, the live class schedule view 630 can include class topics section 632 and live classes modules 634A-N. Class topics section 632 lists one or more class topics for the present course. In some examples, class topics section 632 can list all class topics and/or unattended topics. Live classes modules 634A-N are associated with specific topics or class sessions and can enable access to the specific classes, associated content, materials, and/or information.

In the example shown in FIG. 6B, the live class session modules 634A-N display times and information for specific live classes (e.g., upcoming and/or in session), including the time of the class, the length or duration of the class, the class topic(s), the class instructor(s), a class description, and/or any other class details and/or materials.

In some examples, class materials can be accessed through this interface. In some cases, a user can join or schedule to join one or more classes through the user interface 625. For example, a user can select or click on a class from the live classes modules 634A-N to join or schedule to join that class. Moreover, in some cases, a user can access additional class information and/or content through the live classes modules 634A-N. For example, a user can select a live class module (e.g., 634A, . . . , 634N) to access additional information, materials, and/or functionalities associated with a class corresponding to that live class module.

Figure 6C:
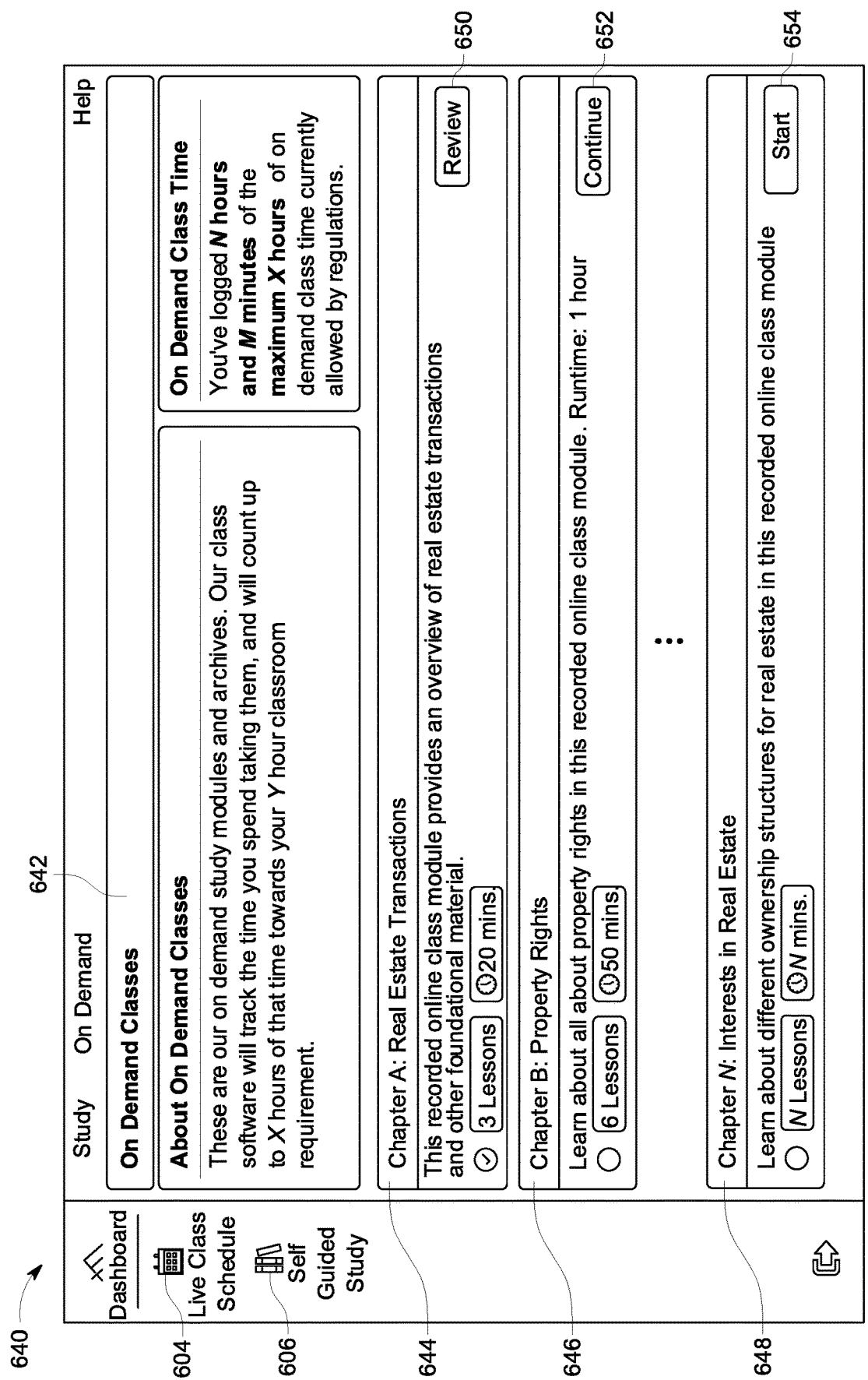
FIG. 6C illustrates an example user interface displaying an example on-demand class and associated chapters, in accordance with various embodiments of the subject technology.

FIG. 6C depicts a self-guided study view 606 of user interface 640. This view displays on demand classes 642 which, for instance, can be recorded lectures or self-paced materials. The on demand classes 642 can have can have specific parameters, variables, settings, etc., configured through the online learning system 102 (e.g., through an administrator and/or settings component, system, module, object, etc.). For example, an administrator can define class requirements and/or settings for one or more on demand classes through the online learning system 102.

Non-limiting examples of class requirements and/or settings can include a total time requirement for a class (e.g., an amount of time to complete the class and/or obtain credit for the class); a maximum amount of time or percentage of time, from the total time requirement for the class, that a user can complete through an on demand and/or live format/usage (e.g., up to n hours from the total hours requirement for class x can be completed through the on demand class format and up to m hours from the total hours requirement for class x can be completed through the live class format); a time period required for completing the total time requirement for the class; a time period for completing a maximum amount of time (from the total time requirement for the class) that a user is allowed to complete through an on demand and/or live class format; a time period in which a user can access the on demand and/or live class format; a time period from which a user can apply on demand class time and/or live class time towards the total time requirement for a class; and/or any other class requirements, limits, settings, etc.

In some examples, an administrator can remove and/or edit limits, requirements, and/or settings for a class through the online learning system 102. For example, an administrator can remove an on demand class time and/or live class time limit set, which provides a maximum amount of time that a user can complete through an on demand and/or live class format. As another example, an administrator can update a class requirement previously set (for example if a jurisdiction requirement changes).

An on demand classes module 642 can include chapter modules 644, 646, and 648 where the user can access content and/or functionalities (e.g., start a chapter, review a chapter, continue a started chapter, etc.) for specific chapters. For example, chapter module 644 includes a review interface element 650 which can allow a user to review material for the chapter associated with the chapter module 644. The chapter in this example is a completed chapter. Thus, the user can review information about the completed chapter from the review element 650 in the chapter module 644. The checkmark next to the lessons box in the chapter module 644 indicates that all lessons have been completed, as well as the number of lessons within chapter associated with the chapter module 644. Lessons may contain embedded multimedia content, text, images, attachments for the user to download (e.g., PDFs, slideshows, spreadsheets, images, documents, videos, files, etc.), and/or any other content. In some examples, the class timer in chapter module 644 can be minimized or maximized by the user and can display the amount of time progress the user has made for the chapter in chapter module 644 and/or the length in time of the chapter in chapter module 644. In some examples, the class timer can turn red to indicate when the student has exhausted their allotted asynchronous course time, assuming there is a limit set on asynchronous time. If there is no limit, it would not change.

Chapter module 646 includes a continue interface element 652 which can allow a user to continue an ongoing or previously-started chapter associated with the chapter module 646. Chapter module 648 includes a start interface element 654 which can allow a user to begin a new chapter associated with chapter module 648.

Figure 6D:
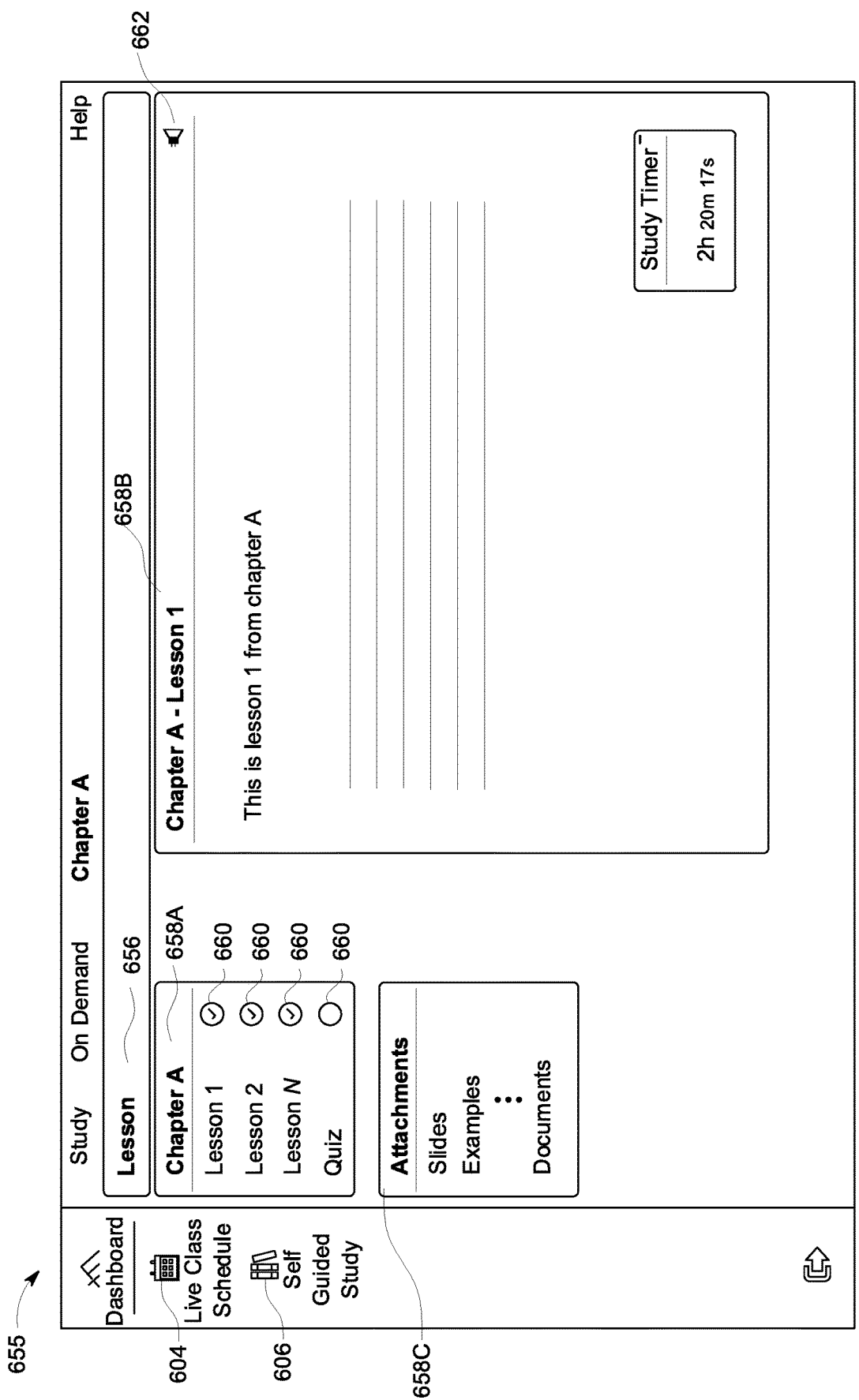
FIG. 6D illustrates an example user interface displaying an example chapter lesson of an on-demand class, in accordance with various embodiments of the subject technology.
Figure 6D:
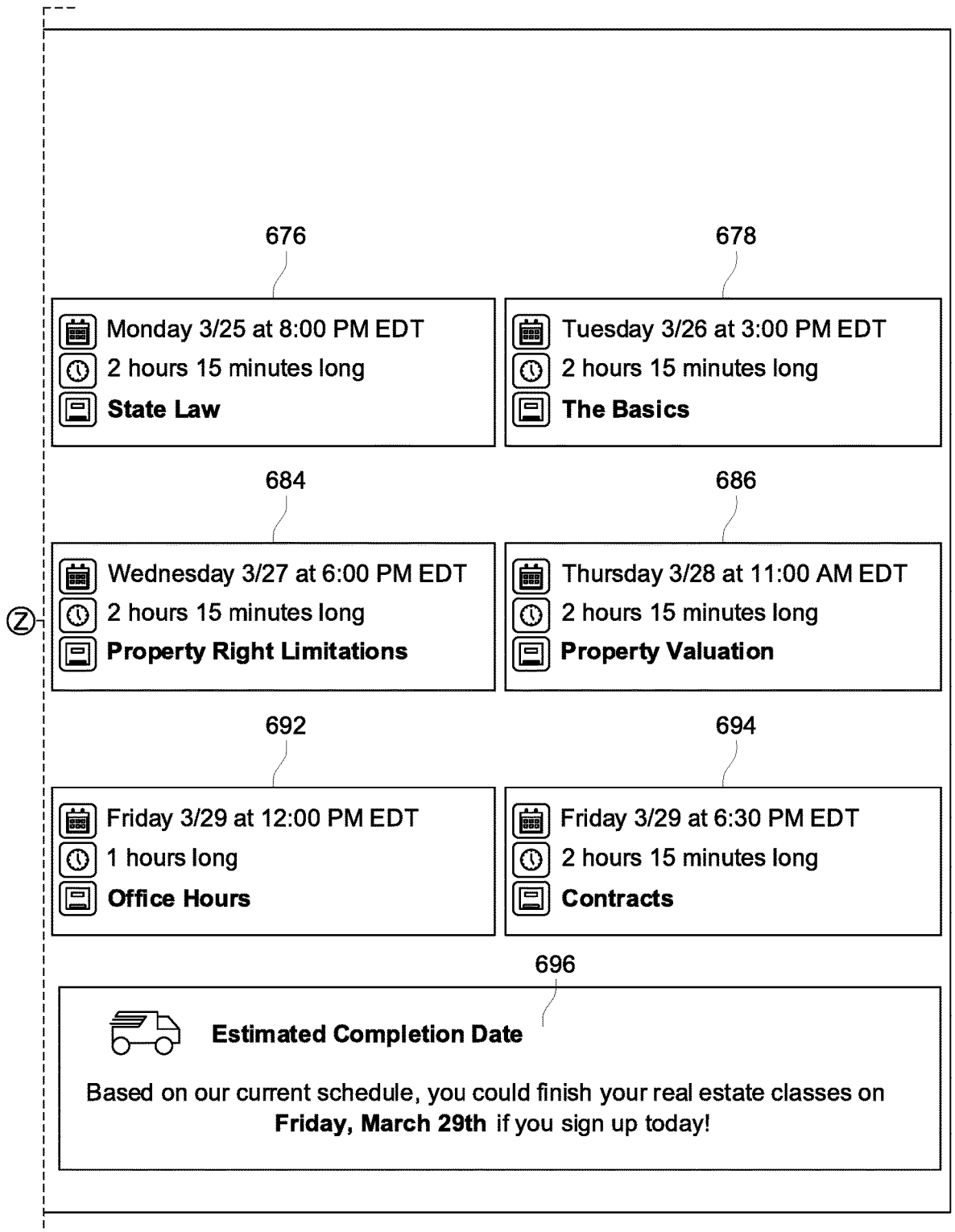

FIG. 6D depicts a self-guided study view 606 of user interface 655. This view displays a lesson view 656 from chapter module 644 shown in FIG. 6C. The lesson view 656 can include a chapter details section 658A which can display content items associated with a chapter, such as, for example, lessons and quizzes. In some examples, the content items displayed in the chapter details section 658A can include indicators 660 which can indicate whether associated content items have been completed and/or accessed (e.g., via checkmarks or any other indicators) or any other status/activity information.

The lesson view 656 can also include a lesson section 658B that can display the content (e.g., the lesson) from a particular lesson of a chapter associated with the lesson view 656. In some examples, the lesson content can include video content, audio content, text content, and/or another form of content. In some examples, the lesson section 658B can include an audio element 662 which can enable a user to select certain audio preferences such as, for example, speaker output, text-to-speech output, etc. In some cases, the audio element 662 provides a text-to-speech option to the user so text from the lesson can be processed and/or output as audio for the user. For example, when the user selects the audio element 662, the system can read the lesson's content aloud to the student (e.g., by outputting audio corresponding to the lesson's content). In some cases, the audio generated may not be pre-recorded, but generated automatically and/or on-demand based on the content uploaded to content management system 104 for the lesson.

In some examples, the lesson section 658B can include a timer that displays an amount of time that has lapsed since the user started the lesson and/or an amount of time that the user has completed for the lesson. In some cases, the lesson view 656 can also include an attachments section 658C that displays attachments associated with the chapter and/or lesson and available for viewing and/or download.

Figure 6E:
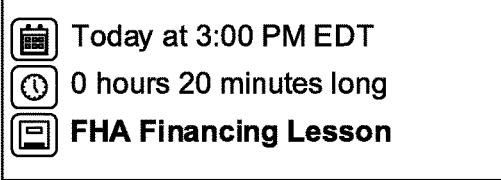
FIG. 6E illustrates an example user interface displaying an example upcoming live online class schedule, in accordance with various embodiments of the subject technology.
Figure 6E:
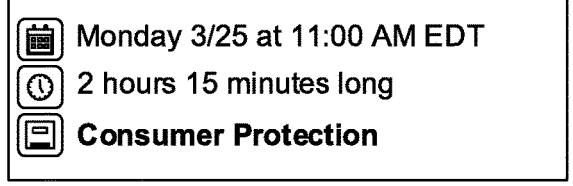
Figure 6E:
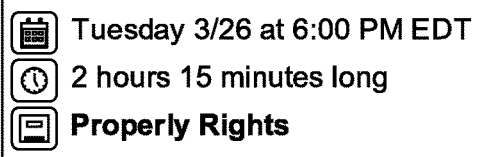
Figure 6E:
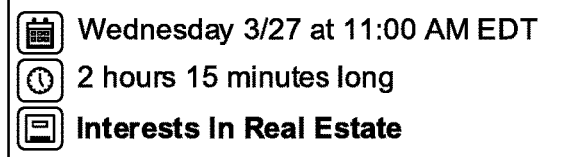
Figure 6E:
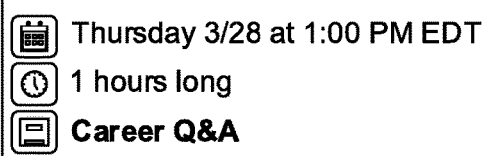
Figure 6E:
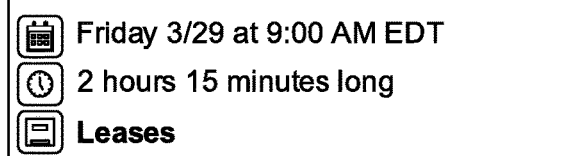

FIG. 6E depicts an example class schedule 670 on user interface 665 showing upcoming live classes 672-694. A student user can review and access upcoming live classes through this interface. In some cases, the student user may not need to be logged in. For example, the interface can be open/published to public users and/or have unrestricted permissions.

In other examples, the student user can access the user interface 665 from a student user account, and one or more aspects of the user interface 665 can be tailored to the student user account. For example, the user interface 665 can display upcoming classes along with student-specific scheduling information, completed prerequisites, preferences, related classes, completed classes, class enrollment information, etc.

In some cases, the user interface 665 can include a predictive module 696 which can calculate a course schedule and/or predict a completion date for a program. In some examples, the predictive module 696 can predict an amount of time and/or a date estimated for the user being able or expected to complete a program. The online learning system 102 can calculate a course schedule(s) and/or predicted completion date(s) for one or more programs and provide such information in the predictive module 696.

In some cases, the online learning system 102 can calculate a course schedule(s) and/or associated predicted completion date(s) or range of completion dates (e.g., minimum and maximum completion dates) for one or more programs based on available courses/classes, total and/or pending course/class requirements (e.g., total time requirements, on demand class time requirements and/or limits, live class time requirements and/or limits, completion time frame requirements and/or limits, etc.), student schedule and/or availability information, course/class schedules, student progress tracked and/or accepted/credited, preferences, rules/criteria, one or more general calendars (e.g., to take into account holidays, weekends, semesters, seasons, etc.), a history (or statistics) of student progress and/or a student progress rate (e.g., a pace) associated with the student and/or a group of students (e.g., an average progress rate calculated based on multiple students), and/or any other progress or schedule-related information. In some examples, the online learning system 102 can calculate multiple schedules and/or associated completion dates to provide multiple options or alternatives to the student.

FIGS. 7A-D illustrate examples of a user interface for an administrator(s) to manage an online learning system, in accordance with various embodiments of the subject technology. The administrator(s) can be administrator 120 and the online learning system can be online learning system 102 from FIG. 1.

Figure 7A:
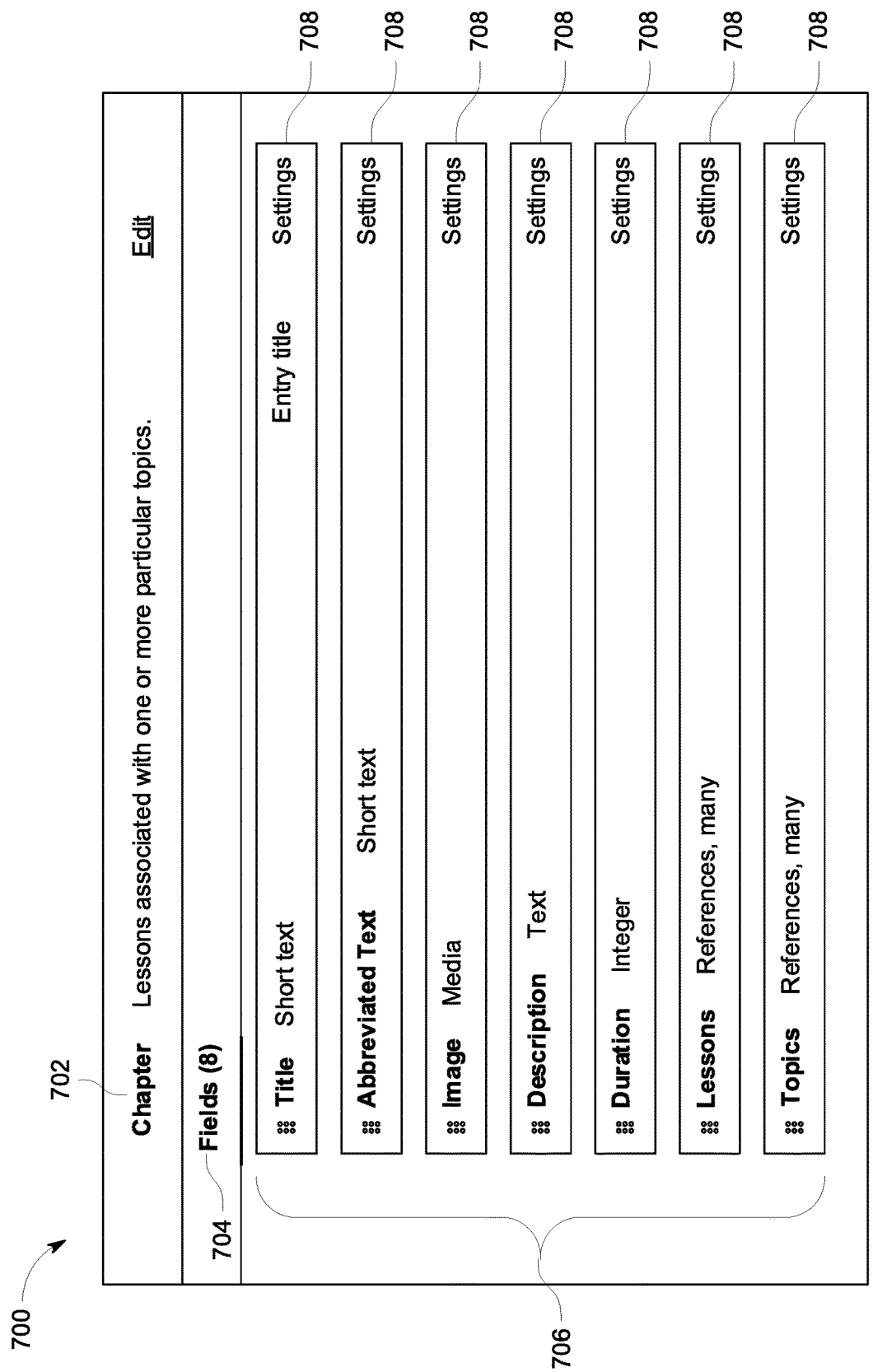

FIG. 7A depicts an administrator chapter view 702 on user interface 700 through which administrator 120 can manage content (such as on CMS 104) and/or settings for on-demand learning. For example, an administrator can manage one or more chapters available for on-demand learning. Fields tab 704 lists the fields 706 available in the chapter. These fields can include lessons, topics, or other factors relevant to the chapter. Settings 708 allow administrator 120 to modify settings for each of the fields 706, such as timing settings, content settings, security settings, tracking settings, display settings, preferences, access settings, etc.

Figure 7B:
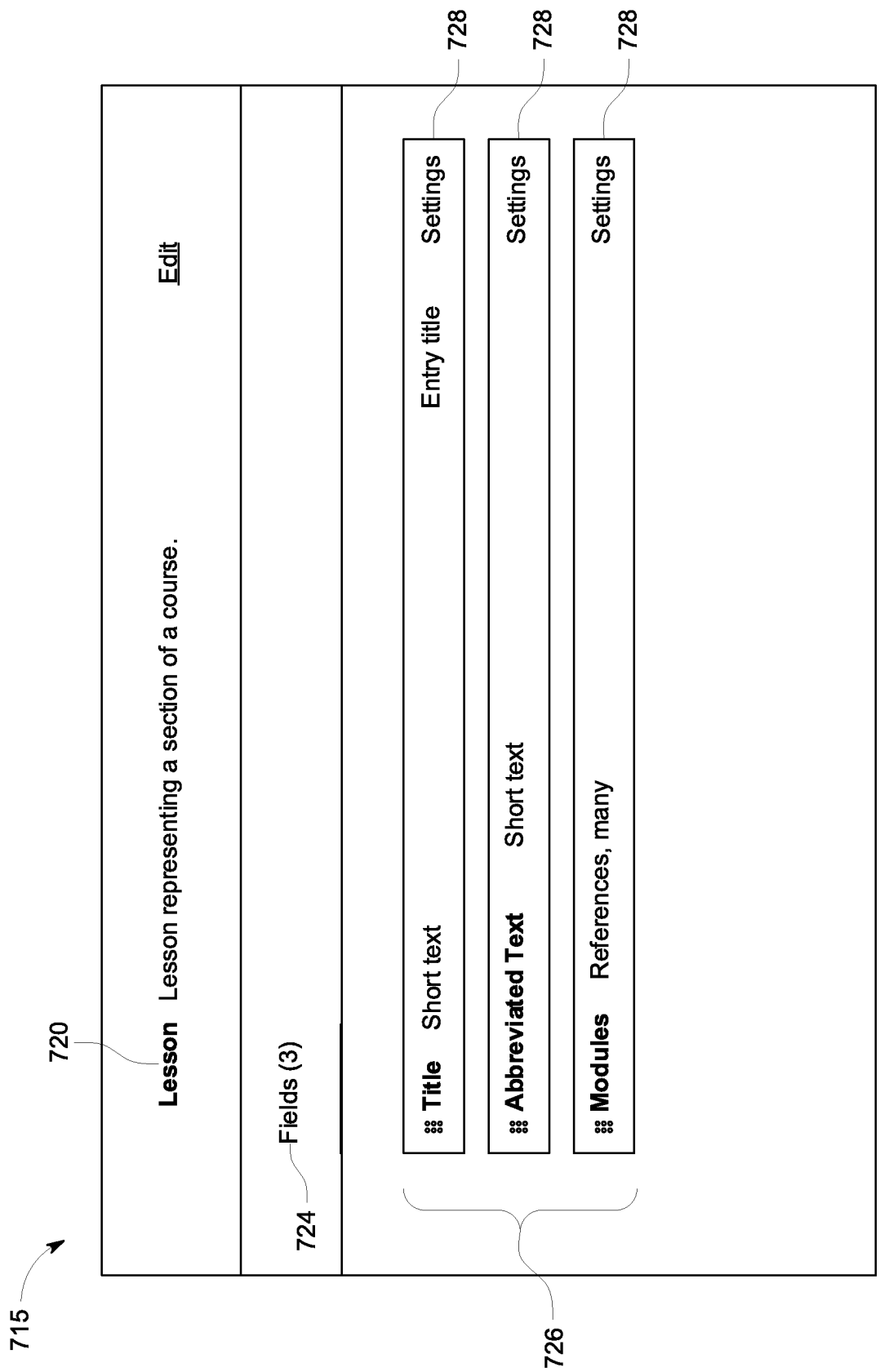

FIG. 7B depicts an administrator lesson view 720 on user interface 715 through which administrator 120 can manage content of a lesson for on-demand learning. Fields tab 724 lists the fields 726 available in the lesson. These fields can include modules, among other units. Settings 728 allow administrator 120 to modify settings for each of the fields 726, such as timing settings, content settings, security settings, tracking settings, display settings, preferences, access settings, etc.

Figure 7C:
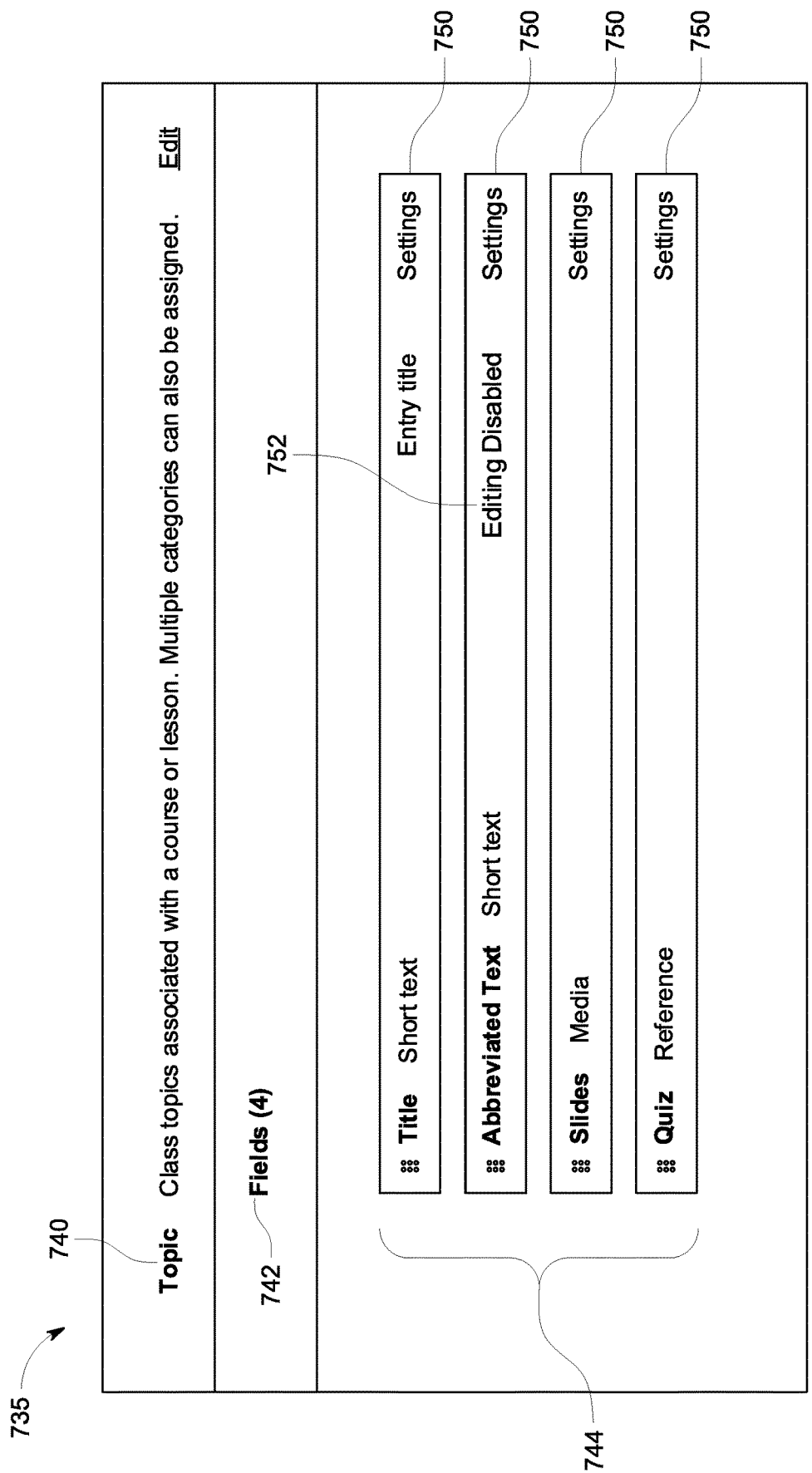

FIG. 7C depicts an administrator topic view 740 on user interface 735 through which administrator 120 can manage content of a topic for on-demand learning. Fields tab 742 lists the fields 744 available in the lesson. These fields can include slides, quizzes, or other content. Settings 750 allow administrator 120 to modify settings for each of the fields 744, such as timing settings, content settings, security settings, tracking settings, display settings, preferences, access settings, etc. For example, through the settings 750, access settings such as an editing disabled setting 752 can be configured for one or more respective fields. The editing disabled setting 752 can prevent users from editing associated materials. In some instances, editing disabled setting 752 can prevent an administrator 120 from editing content in topic view 740.

FIG. 7D depicts an administrator class creation view 760 through which administrator 120 can create a class for online learning by assigning a type, time, current stage in development, associated topics (e.g., as discussed in reference to FIG. 7C above), associated instructor users, and hour length. Tabs 762, 764, 766, and 768 allow administrator 120 to navigate through home, class, content, user, and business views. Creation pane 770 allows administrator 120 to input relevant information to create a new class. Input 772 can define the class type, input 774 can define the start date, input 776 can define the finish date, and topic input 778 can define the topics 780 that the class covers. Input 782 can define the instructors qualified to teach the course, while input 784 can define the hour (or other period/interval) requirement for the course.

Figure 8:
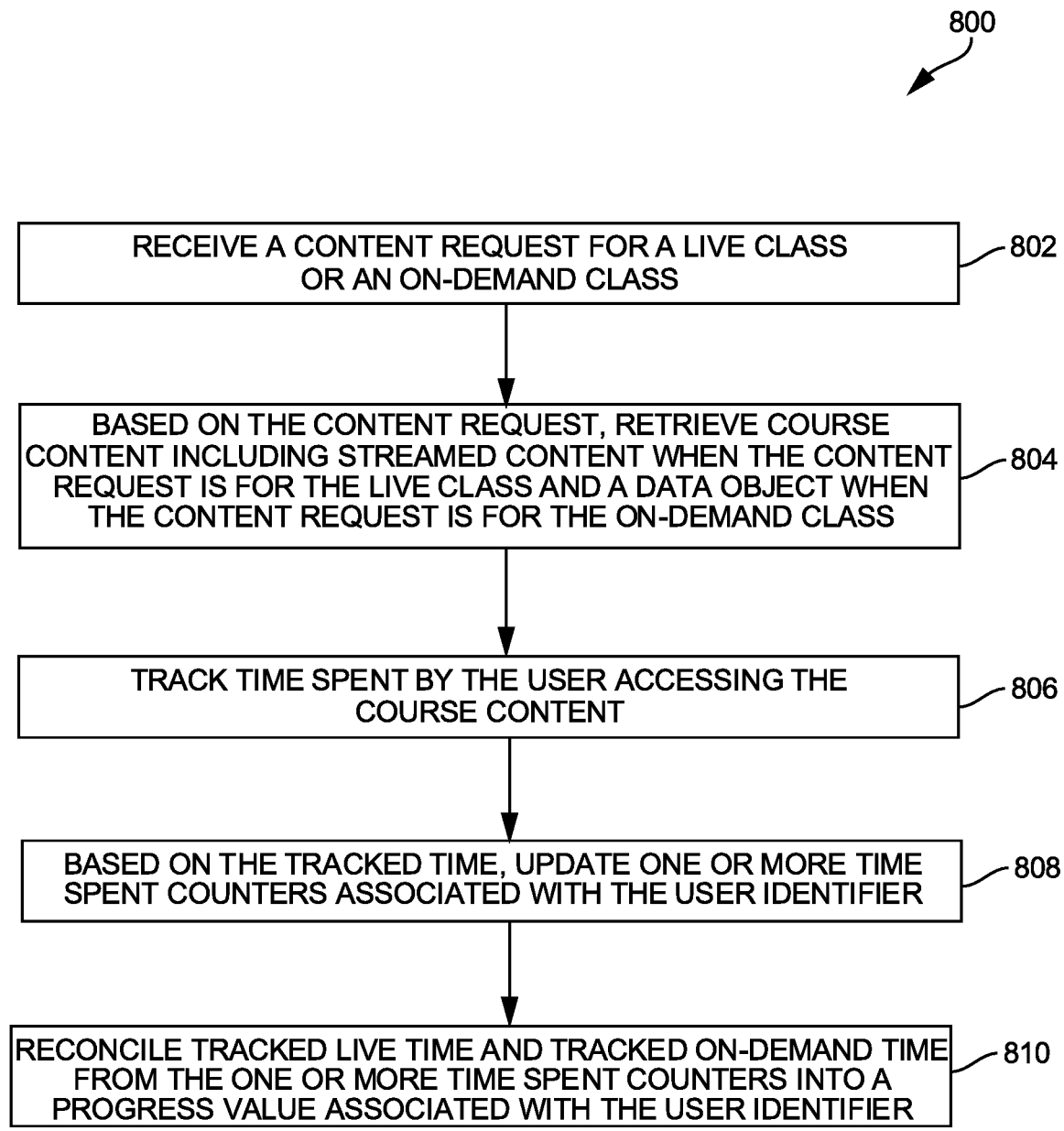
FIG. 8 is a flowchart illustrating an example method for tracking user progress across live and on-demand services, in accordance with various embodiments of the subject technology.

FIG. 8 is a diagram illustrating an example method 800 for tracking user progress across live and on-demand services. At block 802, the method 800 can include receiving, from a user terminal (e.g., 124) associated with a user, one or more content requests. The one or more content requests can include a user identifier associated with the user. Moreover, the one or more content requests can include a request for a live class and/or an on-demand class. In some examples, the one or more content requests can be based on inputs provided via a user interface by the user terminal.

In some cases, the one or more content requests can include multiple requests. For example, the one or more content requests can include one or more requests for the live class and one or more requests for the on-demand class. In some examples, the multiple requests can be received at different periods of time, such as different days, weeks, months, class times, etc. Moreover, in some cases, the live class and the on-demand class can be part of a same course and/or course materials. For example, a class may be offered in a live class format and an on-demand format. Moreover, the live class format may be available at certain times while the on-demand format may be available on request. Here, a user may access the class via the live class in certain instances and via the on-demand class at other instances. In such examples, the method 800 can include receiving multiple requests for the same class, where some requests are for the live class and others are for the on-demand class.

In other examples, the live class and on-demand class can be (or can be part of) different classes that can be combined for credits, progress, licensing, certification, compliance, etc. For example, the live class can be part of a class component of a programming course while the on-demand class can be part of a lab component for the programming course. Here, while the live class and the on-demand class may be different classes, the two may be combined to obtain an overall class progress, receive an overall class credit, satisfy an overall class requirement, satisfy an overall compliance or licensing requirement, satisfy an overall prerequisite, etc.

At block 804, the method 800 can include retrieving course content based on the one or more content requests. In some examples, when the one or more content requests is for the live class, the course content can include streamed content, such as video content/stream, audio content/stream, etc., and when the one or more content requests is for the on-demand class, the course content can include a data object associated with a course, a chapter, and/or a lesson. In some examples, the online learning system can retrieve a study program associated with the course content and, based on requirements for that study program defined by a jurisdiction, an instructor, etc., generate a schedule and predicted completion date for the user.

In some aspects, when the one or more content requests include a request for the live class and a separate request for the on-demand class as previously explained, the method 800 can include retrieving the stream content for the request associated with the live class and retrieving the data object for the request associated with the on-demand class.

At block 806, the method 800 can include tracking, based on one or more electronic reachability messages sent to the user terminal, time spent by the user accessing the course content. In some examples, the one or more electronic reachability messages can include ping messages or packets sent to the user terminal and used to determine that the user terminal is accessing the course content (and/or connected to the online learning system 102) and/or measure an amount of time the user terminal has spent accessing the course content (and/or connected to the online learning system 102).

At block 808, the method 800 can include based on the tracked time, updating, at an online learning system (e.g., 102), one or more time spent counters in a user record associated with the user identifier. In some examples, one or more tracked time values used to update the one or more time spent counters correspond to (e.g., reflect, identify, are based on, etc.) the tracked time. In some cases, the one or more time spent counters can include a counter for live time (e.g., time spent calculated for the live class) and a counter for on-demand time (e.g., time spent calculated for the on-demand class). Moreover, in some examples, the one or more tracked time values can be labeled as live time or on-demand time based on the retrieved course content (and/or the tracked time).

In some cases, the user record can be stored in a user object data store (e.g., 106) associated with the online learning system. Moreover, the user record can be associated with the user identifier and the data object.

At block 810, the method 800 can include reconciling tracked live time and tracked on-demand time from the one or more time spent counters into a progress value associated with the user identifier. The progress value can be stored in the user record. In some embodiments, an administrator can modify the user record or other aspects of the online learning system in order to manually update progress, add or remove courses, modify study programs, or complete other tasks. In some embodiments, the online learning system can provide to the user terminal a user interface configured to display the progress value stored in the user record.

In some aspects, the user can access the course content via both the live class and the on-demand class. For example, the user can access the course content via the live class and later access the course content again via the on-demand class. In some examples, tracking time spent by the user accessing the course content can include tracking time spent by the user accessing the course content via the live class and the on-demand class. Moreover, in some cases, the live time can include time spent by the user accessing course content via the live class, and the on-demand time can include time spent by the user accessing course content via the on-demand class.

In some aspects, the method 800 can include identifying one or more requirements for completing a study program; generating a schedule based on the one or more requirements for completing the study program; and generating a predicted completion date based on the generated schedule. In some cases, the method 800 can further include identifying a jurisdiction associated with the user based on the user identifier, and incorporating one or more jurisdiction requirements into the one or more requirements for completing the study program.

In some aspects, the method 800 can include providing (e.g., serving, rendering, displaying, etc.) a user interface to the user terminal. In some examples, the user interface can be configured to accept or reject the one or more content requests from the user. Moreover, in some examples, the user interface can provide an indication of the progress value stored in the user record. For example, the user interface can display a progress associated with the student and course. The progress can account for tracked on-demand and/or live class time, as previously explained.

In some examples, reconciling tracked live and on-demand time can include adding live class/course time and on-demand class/course time or generating a weighted sum of live class/course time and on-demand class/course time. In some cases, reconciling tracked time can include accounting for live time and on-demand time which covered overlapping material. In some examples, overlapping live and on-demand time can be counted/credited or discounted/ignored. In some cases, configured on demand and/or live class time limits can be used to determine how much of on demand class time and/or live class time can be credited/accepted for the user. For example, if the system has set a maximum amount of time that can be completed through on demand class time and/or a maximum amount of time that can be completed through live class time, the system can apply tracked on demand class progress/time and/or tracked live class progress/time towards a user's completion requirement up to the maximum amount of time allowed for the on demand and/or live class times.

In some cases, the method 800 can include providing (e.g., via online learning system 102) on demand and live class options for a user to select a flexible course/program path that includes a mix of on demand and live class time, scheduling, content, formats, and/or paths for completing the course/program. The method 800 can further include tracking on demand and live class time completed by the user, and reconciling the on demand and live class time to calculate a total course time indicating a total course progress. In some examples, the method 800 can include calculating an estimated course/program completion date for the user based on the total course progress/time and/or one or more course/program requirements (e.g., total completion time requirement).

In some cases, the method 800 can include receiving, from the user, a selection of a course/program path that includes a combination of an on demand class path and a live class path for completing the course/program through a combination of an on demand class format and a live class format. In some cases, the on demand class path and the live class path can include respective amounts of time, topics, courses, materials, etc., to be completed through on demand and live class formats. The method 800 can then include tracking a progress of the user through the on demand and live class content delivery formats/methods, determining an estimated completion date for the user based on the course/program path (e.g., the combined on demand and live class paths), and/or determining when the user has completed a completion requirement (e.g., a time requirement) for the course/program based on a tracked progress corresponding to tracked on demand class time and tracked live class time.

In some examples, the methods herein may be performed by one or more computing devices or apparatuses. In one illustrative example, the methods herein can be performed by online learning system 102 shown in FIG. 1 and/or one or more computing devices with the computing device architecture 900 shown in FIG. 9. In some cases, such a computing device or apparatus may include a processor, microprocessor, microcomputer, or other component of a device that is configured to carry out the steps of any of the methods herein.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The methods herein are illustrated as a logical flow diagrams, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the methods herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
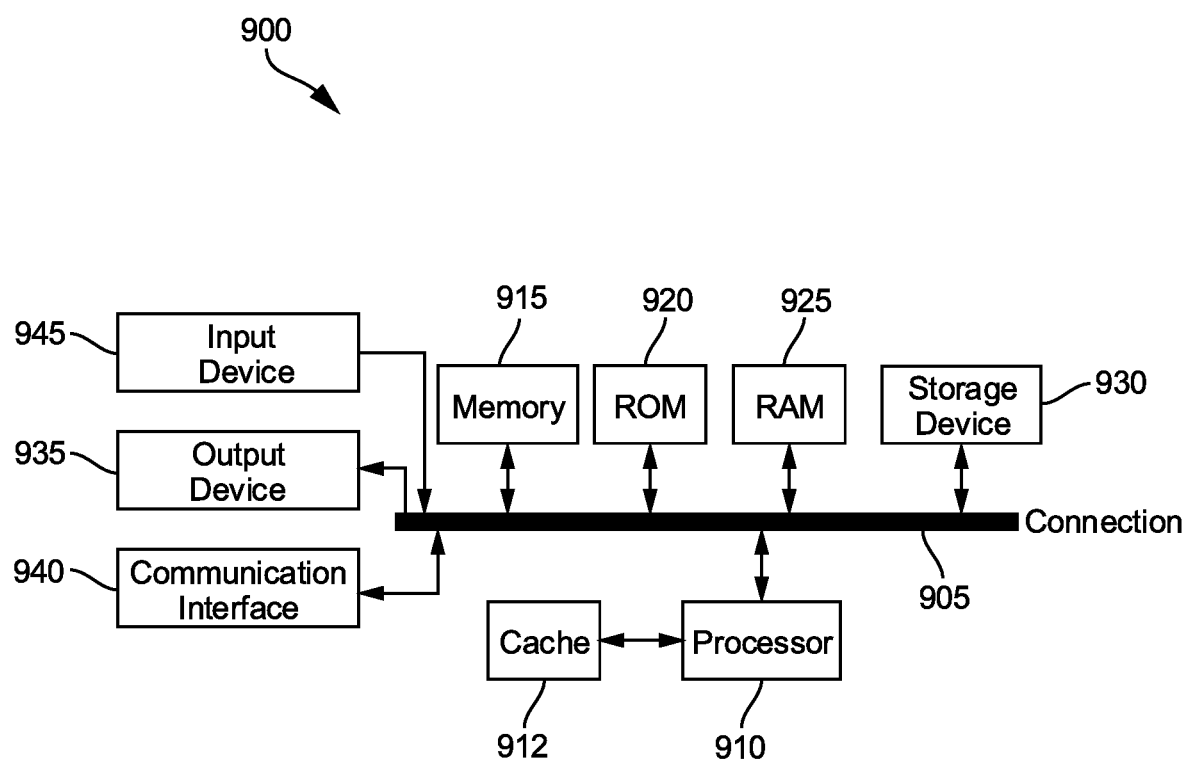
FIG. 9 is a system diagram of an example computing system that may implement various systems and methods disclosed herein, in accordance with various embodiments of the subject technology.

FIG. 9 illustrates an example computing device architecture 900 of an example computing device which can implement various techniques described herein. For example, the computing device architecture 900 can be used to implement at least some portions of the online learning system 102, the administrator device 120, the instructor user device 122, the student device 124, shown in FIG. 1, and perform any operations as described herein. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service stored in storage device 930 and configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device. In some instances, multimodal computing devices can enable a user to provide multiple types of input to communicate with the computing device architecture 900. The communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include software, code, firmware, etc., for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication devices, or integrated circuit devices having multiple uses including application in wireless communications and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above.

The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method comprising:

receiving, by an online learning system comprising one or more processors, content requests from a user terminal associated with a user, the content requests comprising a user identifier associated with the user, wherein one or more first content requests of the content requests are for a live class remotely accessible over a network, and wherein one or more second content requests of the content requests are for an on-demand class stored at the online learning system and accessible over the network;

based on the one or more first content requests, streaming, by the one or more processors associated with the online learning system and to the user terminal, streamed course content of the live class;

based on the one or more second content requests, sending, by the one or more processors associated with the online learning system and to the user terminal, on-demand course content associated with the on-demand class and stored at the online learning system, wherein the on-demand course content comprises a data object associated with at least one of a course, a chapter, and a lesson of the on-demand class;

remotely tracking, based on electronic reachability messages sent to the user terminal over the network, time spent by the user accessing the streamed course content associated with the live class and additional time spent by the user accessing the on-demand course content associated with the on-demand class;

based on a live time value indicating the time spent by the user accessing the streamed course content and an on-demand time value indicating the additional time spent by the user accessing the on-demand course content, updating, by the online learning system, one or more time spent counters in a user record on a database associated with the online learning system, wherein the user record is associated with the user identifier, and wherein the live time value is labeled as live time and the on-demand time value is labeled as on-demand time;

reconciling the live time value and the on-demand time value from the one or more time spent counters, wherein reconciling the live time value and the on-demand time value comprises determining that one or more portions of the live time value and the on-demand time value correspond to non-overlapping course content and one or more different portions of the live time value and on-demand time value correspond to overlapping portions of course content, and adding the one or more portions of the live time value and the on-demand time value corresponding to the non-overlapping course content and excluding the one or more different portions of the live time value and on-demand time value corresponding to the overlapping portions of course content;

based on the reconciling of the live time value and the on-demand time value, generating a progress value associated with the user identifier; and providing, to a user interface associated with the user terminal, display data comprising the progress value.

2. The method of claim 1, further comprising:
identifying one or more requirements for completing a study program associated with the live class and the on-demand;
generating a schedule based on the one or more requirements for completing the study program; and
generating a predicted completion date based on the generated schedule.

3. The method of claim 2, further comprising:
identifying, based on the user identifier, a jurisdiction associated with the user; and
incorporating one or more jurisdiction requirements into the one or more requirements for completing the study program.

4. The method of claim 1, wherein the electronic reachability messages comprise ping messages, and wherein tracking time spent by the user accessing the streamed course content and additional time spent by the user accessing the on-demand course content comprises periodically pinging the user terminal at one or more intervals and determining user activity at the user terminal based on the ping messages.

5. The method of claim 1, further comprising:
identifying one or more requirements for completing a study program associated with the live class and the on-demand class; and
determining a course completion state based on a comparison of the progress value and at least one of the one or more requirements.

6. The method of claim 1, wherein reconciling the live time value and the on-demand time value comprises:
adding respective portions of the live time value and the on-demand time value corresponding to different course content.

7. The method of claim 1,
wherein the user interface is configured to accept or reject the content requests from the user, wherein the user interface provides an indication of the progress value stored in the user record.

8. A system comprising:
one or more processors; and
at least one non-transitory computer-readable storage medium having stored thereon instructions which, when executed by the one or more processors, cause the one or more processors to:
receive, from a user terminal associated with a user, content requests comprising a user identifier associated with the user, wherein one or more first content requests of the content requests are for a live class remotely accessible over a network, and wherein one or more second content requests of the content requests are for an on-demand class stored on the system and accessible over the network;
based on the one or more first content requests, stream, to the user terminal, streamed course content of the live class;
based on the one or more second content requests, send, to the user terminal, on-demand course content associated with the on-demand class and stored on the system, wherein the on-demand course content comprises data associated with at least one of a course, a chapter, and a lesson of the on-demand class;
track, based on electronic reachability messages sent over the network to the user terminal, time spent by the user accessing the streamed course content associated with the live class and additional time spent by the user accessing the on-demand course content associated with the on-demand class;
based on a live time value indicating the time spent by the user accessing the streamed course content and an on-demand time value indicating the additional time spent by the user accessing the on-demand course content, update one or more time spent counters in a user record on a database, wherein the user record is associated with the user identifier, and wherein the live time value is labeled as live time and the on-demand time value is labeled as on-demand time;
reconcile the live time value and the on-demand time value from the one or more time spent counters, wherein reconciling the live time value and the on-demand time value comprises determining that one or more portions of the live time value and the on-demand time value correspond to non-overlapping course content and one or more different portions of the live time value and on-demand time value correspond to overlapping portions of course content, and adding the one or more portions of the live time value and the on-demand time value corresponding to the non-overlapping course content and excluding the one or more different portions of the live time value and on-demand time value corresponding to the overlapping portions of course content;
based on the reconciling of the live time value and the on-demand time value, generate a progress value associated with the user identifier, the progress value stored in the user record; and
providing, to a user interface associated with the user terminal, display data comprising the progress value.

9. The system of claim 8, the at least one non-transitory computer-readable storage medium having stored thereon instructions which, when executed by the one or more processors, cause the one or more processors to:
identify one or more requirements for completing a study program associated with the live class and the on-demand;
generate a schedule based on the one or more requirements for completing the study program; and
generate a predicted completion date based on the generated schedule.

10. The system of claim 9, the at least one non-transitory computer-readable storage medium having stored thereon instructions which, when executed by the one or more processors, cause the one or more processors to:
identify, based on the user identifier, a jurisdiction associated with the user; and
incorporate one or more jurisdiction requirements into the one or more requirements for completing the study program.

11. The system of claim 8, the at least one non-transitory computer-readable storage medium having stored thereon instructions which, when executed by the one or more processors, cause the one or more processors to:
- identify one or more requirements for completing a study program associated with the live class and the on-demand; and
- determine a course completion state based on a comparison of the progress value and a completion requirement from the one or more requirements.

12. The system of claim 8, wherein reconciling the live time value and the on-demand time value comprises:
- adding respective portions of the live time value and the on-demand time value corresponding to different course content.

13. The system of claim 8, wherein the electronic reachability messages comprise ping messages, and wherein tracking time spent by the user accessing the streamed course content and additional time spent by the user accessing the on-demand course content comprises periodically pinging the user terminal at one or more intervals and determining user activity at the user terminal based on the ping messages.

14. At least one non-transitory computer-readable storage medium comprising instructions which, when executed by one or more processors, cause the one or more processors to:
- receive, by an online learning system, content requests from a user terminal associated with a user, one or more content requests comprising a user identifier associated with the user, the content requests comprising a user identifier associated with the user, wherein one or more first content requests of the content requests are for a live class remotely accessible over a network, and wherein one or more second content requests of the content requests are for an on-demand class stored at the online learning system and accessible over the network;
- based on the one or more first content requests, streaming, by the one or more processors associated with the online learning system and to the user terminal, streamed course content of the live class;
- based on the one or more second content requests, send, by the online learning system and to the user terminal, on-demand course content associated with the on-demand class and stored at the online learning system, wherein the on-demand course content comprises data associated with at least one of a course, a chapter, and a lesson of the on-demand class;
- remotely track, based on electronic reachability messages sent to the user terminal over the network, time spent by the user accessing the streamed course content associated with the live class and additional time spent by the user accessing the on-demand course content associated with the on-demand class;
- based on a live time value indicating the time spent by the user accessing the streamed course content and an on-demand time value indicating the additional time spent by the user accessing the on-demand course content, update one or more time spent counters in a user record on a database associated with the online learning system, wherein the user record is associated with the user identifier, and wherein the live time value is labeled as live time and the on-demand time value is labeled as on-demand time;
- reconcile the live time value and the on-demand time value from the one or more time spent counters, wherein reconciling the live time value and the on-demand time value comprises determining that one or more portions of the live time value and the on-demand time value correspond to non-overlapping course content and one or more different portions of the live time value and on-demand time value correspond to overlapping portions of course content, and adding the one or more portions of the live time value and the on-demand time value corresponding to the non-overlapping course content and excluding the one or more different portions of the live time value and on-demand time value corresponding to the overlapping portions of course content;
- based on the reconciling of the live time value and the on-demand time value, generate a progress value associated with the user identifier, the progress value stored in the user record; and
- provide, to a user interface associated with the user terminal, display data comprising the progress value.

15. The at least one non-transitory computer-readable storage medium of claim 14, storing instructions which, when executed by the one or more processors, cause the one or more processors to:
- identify one or more requirements for completing a study program associated with the live class and the on-demand;
- generate a schedule based on the one or more requirements for completing the study program; and
- generate a predicted completion date based on the generated schedule.

16. The at least one non-transitory computer-readable storage medium of claim 15, wherein the electronic reachability messages comprise network packets sent to the user terminal, and wherein tracking time spent by the user accessing the streamed course content and additional time spent by the user accessing the on-demand course content comprises:
- periodically sending one or more network packets to the user terminal;
- verifying, based on the one or more network packets, user access to the streamed course content and the on-demand course content; and
- measuring user participation in the live class and the on-demand class based on the one or more network packets.

17. The at least one non-transitory computer-readable storage medium of claim 14, wherein reconciling the live time value and the on-demand time value comprises:
- adding the respective portions of the live time value and the on-demand time value corresponding to different course content.

18. The at least one non-transitory computer-readable storage medium of claim 14, wherein the electronic reachability messages comprise ping messages, and wherein tracking time spent by the user accessing the streamed course content and additional time spent by the user accessing the on-demand course content comprises periodically pinging the user terminal at one or more intervals and determining user activity at the user terminal based on the ping messages.

* * * * *